(12) United States Patent
Yoshida et al.

(10) Patent No.: US 6,543,220 B2
(45) Date of Patent: Apr. 8, 2003

(54) EXHAUST EMISSION CONTROL APPARATUS OF INTERNAL COMBUSTION ENGINE

(75) Inventors: Iwao Yoshida, Yokohama (JP); Tsutomu Kikuchi, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/741,839

(22) Filed: Dec. 22, 2000

(65) Prior Publication Data

US 2003/0041593 A1 Mar. 6, 2003

(30) Foreign Application Priority Data

Dec. 27, 1999 (JP) .......................................... 11-370134

(51) Int. Cl.[7] ................................................. F01N 3/00
(52) U.S. Cl. .......................................... 60/285; 60/274
(58) Field of Search ........................... 60/274, 285, 289, 60/290; 123/399, 179.18

(56) References Cited

U.S. PATENT DOCUMENTS

| | | | | |
|---|---|---|---|---|
| 3,960,130 A | * | 6/1976 | Peterson, Jr. ................ | 123/179 |
| 4,383,506 A | * | 5/1983 | Atago et al. ................. | 123/179 |
| 4,693,432 A | * | 9/1987 | Itou et al. ..................... | 123/432 |
| 5,255,653 A | * | 10/1993 | Ironside et al. .............. | 123/399 |
| 5,522,360 A | * | 6/1996 | Suzuki et al. ................ | 123/329 |
| 5,542,388 A | * | 8/1996 | Ichinose et al. ........ | 123/179.18 |
| 5,632,249 A | * | 5/1997 | Sadakane et al. ........... | 123/442 |
| 5,655,498 A | * | 8/1997 | Suzuki et al. ................ | 123/308 |
| 5,704,324 A | * | 1/1998 | Ichinose et al. ........ | 123/179.18 |
| 5,720,258 A | * | 2/1998 | Tolkacz et al. .............. | 123/352 |
| 5,823,163 A | * | 10/1998 | Hoshi ..................... | 123/179.18 |

FOREIGN PATENT DOCUMENTS

| | | |
|---|---|---|
| JP | 63-143349 | 6/1988 |
| JP | 8-109836 | 4/1996 |

* cited by examiner

*Primary Examiner*—Thomas Denion
*Assistant Examiner*—Diem Tran
(74) *Attorney, Agent, or Firm*—Foley & Lardner

(57) ABSTRACT

In an exhaust emission control apparatus of an internal combustion engine with an intake air flow control valve controlling intake air flow exerting an influence upon a behavior of fuel injected from a fuel injector, and an electric valve actuator electrically operated by a storage battery serving as an electric power source to drive the intake air flow control valve, an electronic control unit is provided for controlling an opening of the intake air flow control valve. The control unit controls the opening of the intake air flow control valve to a predetermined intermediate valve opening by the valve actuator during an engine stopping period. Also, the control unit holds the intake air flow control valve at the predetermined intermediate valve opening to which the intake air flow control valve has been driven in advance during the engine stopping period, by inhibiting operation of the valve actuator during an engine-cranking operating mode at a starting period.

24 Claims, 12 Drawing Sheets

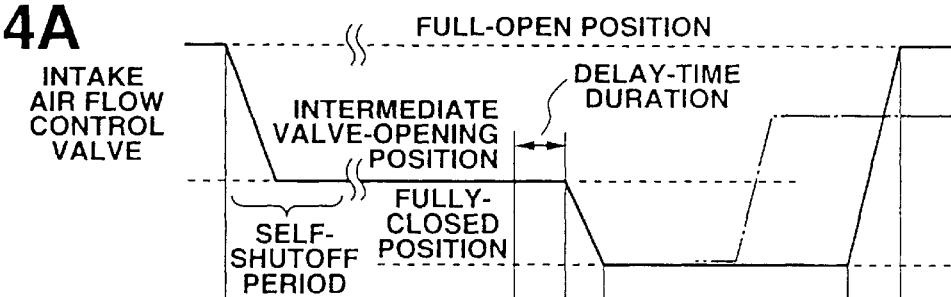
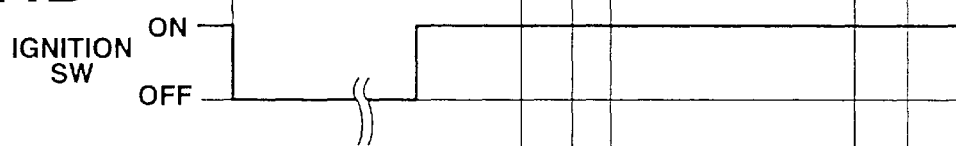
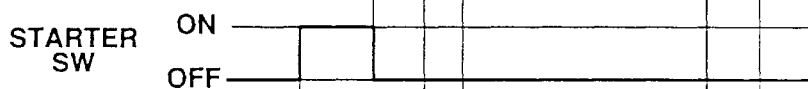
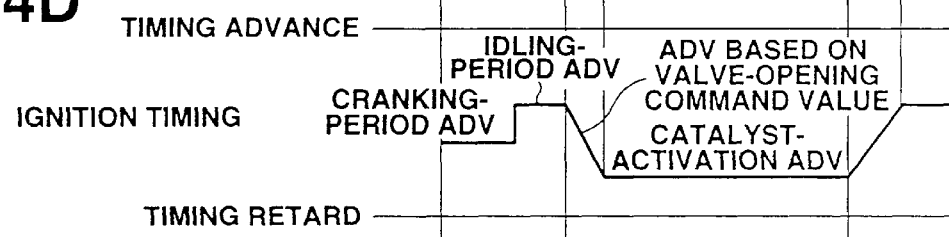
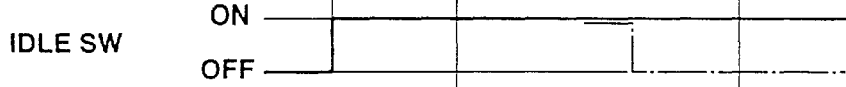

EXHAUST EMISSION CONTROL APPARATUS OF INTERNAL COMBUSTION ENGINE

TECHNICAL FIELD

The present invention relates to an exhaust emission control apparatus of an internal combustion engine, and particularly to such a control apparatus of an internal combustion engine employing an intake air flow control valve actuator to which voltage is applied from a car storage battery to drive an intake air flow control valve.

BACKGROUND ART

An airflow control valve is generally used in induction systems of internal combustion engines. In an intake system disclosed in Japanese Patent Provisional Publication No. 63-143349, an intake air quantity control valve such as a butterfly valve is provided in an intake air passage to adjust a quantity of intake air entering a combustion chamber, and during engine cranking the butterfly valve is driven in a direction decreasing the intake-air quantity and kept at its closed position, so as to prevent knocking during the starting period. In this case, the butterfly valve is returned to its full-open position with a delay time after complete explosion. In an internal combustion engine disclosed in Japanese Patent Provisional Publication No. 8-109836, an intake air flow control valve such as a butterfly valve is provided in an intake-air passage between a throttle valve and a fuel injection valve, and in order to prevent icing (occurring owing to freezing of condensed water adhered to the inner wall surface of the intake-air passage) and to rapidly drive the butterfly valve during the engine starting period, the butterfly valve is held temporarily at an intermediate valve-opening position at the time when the engine is stopped. During the engine cranking (or when the engine is restarted), the butterfly valve is driven to its closed position to constrict airflow entering the combustion chamber, and to increase the negative pressure (boost), thereby promoting atomization of fuel spray injected from the injection valve for good combustion.

SUMMARY OF THE INVENTION

When a valve actuator having a driving connection with the previously-noted intake air quantity control valve (butterfly valve) or the previously-noted intake air flow control valve (butterfly valve) is an electric actuator which is electrically operated by means of an electric power source such as a storage battery, there is a possibility that the electric valve actuator cannot be smoothly driven and thus the butterfly valve cannot be smoothly controlled to a desired valve opening due to a momentary drop in battery voltage during cranking, in particular during engine starting in cold weather (see FIG. 6). As shown in FIG. 6, during cold-start operation, the battery voltage varies remarkably. That is, as soon as the engine is brought into the cranking state by turning the starter switch ON, a large amount of current flows into the starter motor and as a result the battery voltage temporarily reduces to below approximately 8 volts. Thereafter, when the complete explosion is assured and thus the starter switch is turned off to terminate the engine-cranking operating mode, the battery voltage rises up to a specified voltage level (approximately 14 volts). A step motor is often used as an electric valve actuator. As is generally known, the battery voltage, which is less than a predetermined voltage level (e.g., 10 volts) below the specified voltage level (approximately 14 volts), never assures operation of the step motor. Assuming that the lowest voltage that assures operation of the step motor is defined as a step-motor operating voltage limit (or a step-motor operation assurance voltage), there is an increased tendency for the battery voltage to become less than the operating voltage limit during engine cranking at the starting period. In such a case, even when a command signal or a step-motor drive signal is output to the step motor, the butterfly valve (serving as the intake air quantity control valve or the intake air flow control valve) cannot be accurately driven to the desired valve opening.

Accordingly, it is an object of the invention to provide an exhaust emission control apparatus of an engine, which avoids the aforementioned disadvantages.

It is another object of the invention to provide an exhaust emission control apparatus of an engine employing an intake air flow control valve in an induction system, which avoids the control accuracy of the intake air flow control valve from deteriorating during engine cranking at a starting period, in particular during cold-start operation.

In order to accomplish the aforementioned and other objects of the present invention, an exhaust emission control apparatus of an internal combustion engine, comprises a fuel injector which injects fuel into an intake air passage, an intake air flow control valve which controls intake air flow exerting an influence upon a behavior of fuel injected from the fuel injector, a valve actuator which is electrically operated by a storage battery serving as an electric power source to drive the intake air flow control valve, and a control unit connected electrically to at least the valve actuator for controlling an opening of the intake air flow control valve, the control unit having a processor programmed to perform the following, controlling the opening of the intake air flow control valve to a predetermined intermediate valve opening by the valve actuator during an engine stopping period, and holding the intake air flow control valve at the predetermined intermediate valve opening, by inhibiting operation of the valve actuator during an engine-cranking operating mode at a starting period.

According to another aspect of the invention, an internal combustion engine comprises fuel-injection means for injecting fuel into an intake air passage, valve means for controlling intake air flow exerting an influence upon a behavior of fuel injected from the fuel-injection means, drive means electrically operated by a storage battery serving as an electric power source for driving the valve means, and a control unit connected electrically to at least the drive means and the storage battery for controlling an opening of the valve means, the control unit comprising means for controlling the opening of the valve means to a predetermined intermediate valve opening by the drive means during an engine stopping period, and means for holding the valve means at the predetermined intermediate valve opening to which the valve means has been driven in advance during the engine stopping period, by inhibiting operation of the drive means during an engine-cranking operating mode at a starting period.

According to a further aspect of the invention, a method of controlling exhaust emissions emitted from an internal combustion engine with a fuel injector injecting fuel into an intake air passage, an intake air flow control valve, and an electric valve actuator electrically operated by a storage battery serving as an electric power source to drive the intake air flow control valve, the method comprises controlling intake air flow exerting an influence upon a behavior of fuel injected from the fuel injector, controlling the opening of the intake air flow control valve to a predetermined intermediate valve opening by the electric valve actuator during an engine stopping period, and holding the intake air flow control valve at the predetermined intermediate valve opening, by inhibiting operation of the electric valve actuator during an engine-cranking operating mode at a starting period. It is preferable that the method may further comprises inhibiting the operation of the valve actuator for a predetermined delay-time duration from a time when the engine-cranking operating mode has been completed, and enabling the operation of the valve actuator to drive the air flow control valve toward a valve opening that reduces a density of unburned hydrocarbons emissions during engine idling after expiration of the predetermined delay-time duration.

BRIEF DESCRIPTION OF THE DRAWINGS

FIGS. 4A–4G are timing charts explaining operation of the intake air flow control valve when the engine is stopped and thereafter when restarting a cold engine.

DESCRIPTION OF THE PREFERRED EMBODIMENTS

Figure 1:
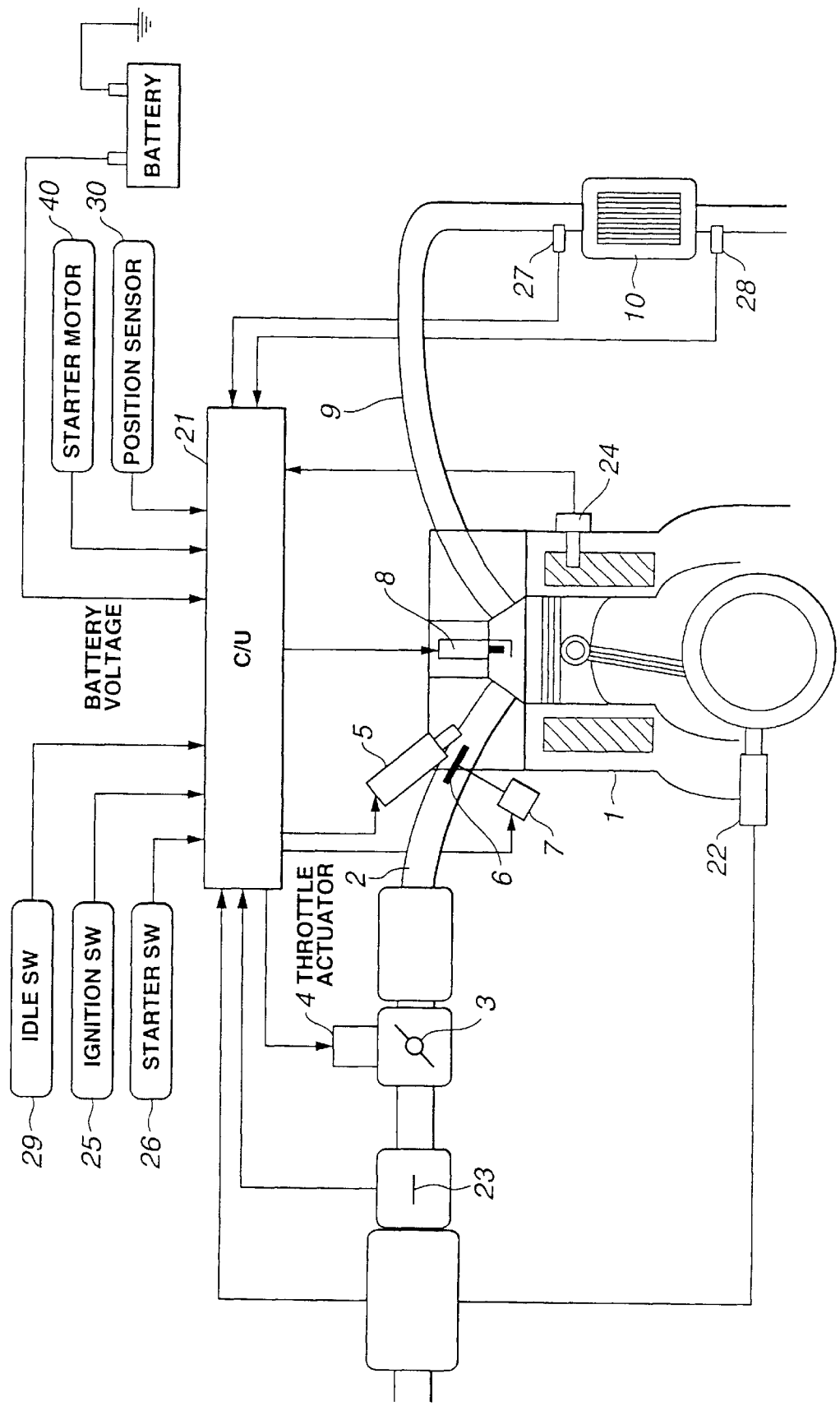
FIG. 1 is a system block diagram showing one embodiment of the exhaust emission control apparatus of the invention.
Figure 2:
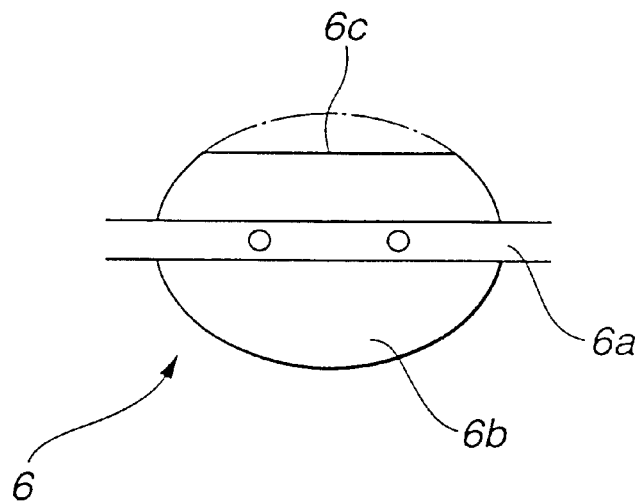
FIG. 2 is a plan view of an intake air flow control valve (butterfly valve).
Figure 3:
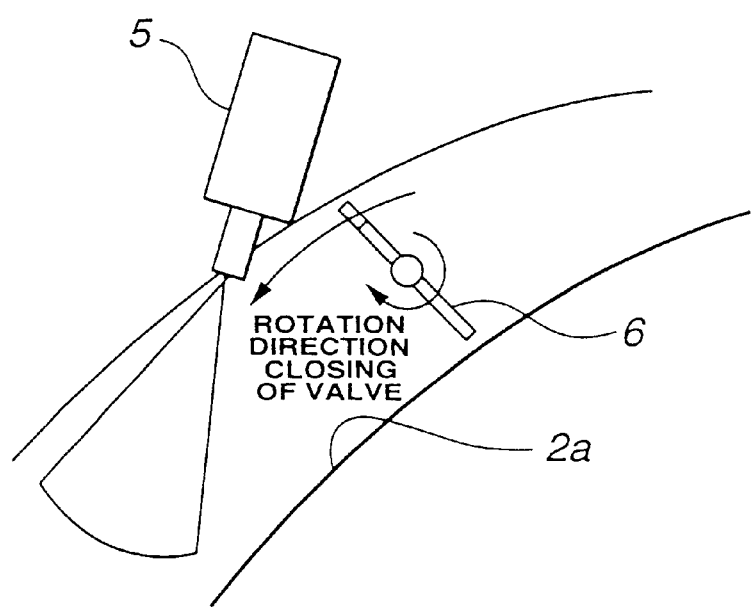
FIG. 3 is an enlarged view illustrating a section of the intake air flow control valve located just upstream of a fuel injection valve in the induction system of the engine shown in FIG. 1.

Referring now to the drawings, particularly to FIG. 1, the exhaust emission control apparatus of the invention is exemplified in an automotive spark ignition internal combustion engine 1 with a multi-point fuel injection system. In FIG. 1, a throttle valve 3 is located in an intake air passage 2 of engine 1. A fuel injection valve (or a fuel injector) 5 is included in an electronic fuel injection system and is provided downstream of throttle valve 3 in the intake air passage. Fuel injection valve 5 is responsive to a fuel injection signal generated from an output interface of an electronic control unit (C/U or ECU) 21 which will be fully described later, for injecting fuel spray toward an intake port and for controlling an air-fuel ratio, often abbreviated to "A/F" or "AFR", as close to a desired air/fuel mixture ratio as possible, depending upon engine operating conditions such as engine speed and engine load. A part denoted by reference sign 8 is a spark plug generally screwed into the cylinder head of engine 1 to ignite the air-fuel mixture in the combustion chamber. An ignition timing of spark plug 8 is electronically controlled by means of an electronic ignition system. Throttle valve 3 is comprised of an electronically-controlled throttle valve which is actuated by means of a throttle actuator 4. The throttle actuator is driven electromagnetically in response to a control signal from ECU 21. In FIG. 1, a part denoted by reference sign 40 is a starter motor. ECU 21 generally comprises a microcomputer. The ECU includes an input/output interface (I/O) or an input interface circuitry and an output interface circuitry, memories (RAM, ROM), and a microprocessor or a central processing unit (CPU). The input interface of ECU 21 receives input information from various engine/vehicle switches and sensors, namely a crank angle sensor or a crankshaft position sensor 22, an airflow meter 23, an engine temperature sensor 24, an ignition switch 25, a starter switch 26, an upstream oxygen sensor 27, a downstream oxygen sensor 28, an idle switch 29, and an intake air flow control valve position sensor 30. The crank angle sensor 22 is bolted to the engine to inform the ECU of engine speed Ne as well as the relative position of the engine crankshaft. For instance, crank angle sensor 22 generates a reference signal, often called "Ref signal", at each predetermined crank angle. The predetermined crank angle is generally set at 90 degrees in four-cylinder engines, and set at 120 degrees in six-cylinder engines. Airflow meter 23 is located upstream of the throttle valve in the induction system to generate a voltage signal proportional to a quantity of intake air drawn into the engine. A coolant temperature sensor is generally used as engine temperature sensor 24. The coolant temperature sensor is located on the engine and usually screwed into one of the coolant passages to sense the actual operating temperature (coolant temperature or water temperature Tw) of the engine. The ECU determines the current engine operating conditions on the basis of input information signals from these sensors 22, 23, and 24, and controls the air/fuel ratio as close to a desired air/fuel ratio as possible, based upon the current engine operating conditions. That is, depending upon the current operating conditions, the engine operating mode is switched between a lean air/fuel mixture ratio operating mode and a stoichiometric air/fuel mixture ratio. The upstream oxygen sensor 27 is located upstream of a catalyst or a catalytic converter 10 to monitor the percentage of oxygen contained within the engine exhaust gases entering the catalyst at all times when the engine is running. In a similar manner, the downstream oxygen sensor 28 is located downstream of catalyst 10 to monitor the percentage of oxygen contained within the outgoing engine exhaust gases passing through the catalyst at all times when the engine is running. During the stoichiometric A/F operating mode, ECU 21 is feedback-controlling the air/fuel ratio as close as stoichiometric as possible, based on both input signals from upstream and downstream oxygen sensors 27 and 28, for complete fuel combustion and minimum exhaust emissions. In the shown embodiment, each of the upstream and downstream oxygen sensors is comprised of a temperature-sensor built-in, heated oxygen sensor. The purpose of the temperature sensor incorporated in the heated oxygen sensor is to monitor the temperature of the heated oxygen sensor. The heated type oxygen sensor has a sensing element disposed in an exhaust passage 9 for monitoring the content of oxygen contained within the exhaust gases to generate an output signal in response to changes in the content of oxygen, and a heating element (or a heater) inside for heating the sensing element. When the temperature of the heated oxygen sensor reduces to below a predetermined operating temperature value, the heating element is energized to rise the temperature of the heated oxygen sensor up to the predetermined operating temperature value. When the temperature monitored reaches the predetermined operating temperature value, the heating element is deenergized. In this manner, the heated oxygen sensor, which reaches the predetermined operating temperature within seconds after the ignition switch is turned on, permits early closed-loop control (early AFR feedback control). The heating element of the heated oxygen sensor functions to maintain the oxygen sensor at the activated state at all times when the engine is running. The previously-noted catalyst 10, provided in exhaust passage 9, is a three-way catalyst for reduction of oxides of nitrogen (NOx) and for oxidation of the HC and CO. The three-way catalyst has a maximum conversion efficiency during the closed-loop control in which the ECU operates to maintain the A/F at as close to a stoichiometric air/fuel ratio of 14.7:1 as possible. It will be understood that catalyst 10 is not limited to such a three-way catalyst, but that various catalysts, such as a NOx reduction catalyst may be used. Ignition switch 25 generates a signal indicative of an On or OFF condition thereof to the input interface of ECU 21. Similarly, starter switch 26 generates a signal indicative of an On or OFF condition thereof to the input interface of ECU 21. Idle switch 29 generates a signal indicative of an On or OFF condition thereof to the input interface of ECU 21. As shown in FIGS. 1, 2 and 3, an intake air flow control valve 6 is disposed in the intake port 2a just upstream of the injection nozzle of fuel injection valve 5. Air flow control valve 6 is driven by means of an electric valve actuator. In the control apparatus of the embodiment, the electric valve actuator for air flow control valve 6 is comprised of a step motor 7 whose angular steps or angular movements are obtained electromagnetically. As clearly seen in FIG. 1, the actual opening of air flow control valve 6 is monitored or detected by the position sensor 30. Actually, the position sensor 30 is designed to monitor the angular position of step motor 7 as the actual opening of air flow control valve 6. Within the ECU, the central processing unit (CPU) allows the access by the I/O interface of input informational data signals from the previously-discussed engine/vehicle switches and sensors. The CPU of ECU 21 is responsible for carrying at least predetermined air flow control valve opening control/ignition timing control programs stored in memories and is capable of performing necessary arithmetic and logic operations shown in FIGS. 8–12, and 16. Computational results (arithmetic calculation results), that is, calculated output signals (solenoid drive currents) are relayed via the output interface of the ECU to output stages, namely a throttle valve actuator 4, the step motor 7 for intake air flow control valve 7, electromagnetic solenoids of the injection valves, the spark plug included in an electronic ignition system, and the starter motor. Returning to FIG. 2, air flow control valve 6 is comprised of a valve shaft 6a and an elliptical valve body 6b fixedly connected to the valve shaft usually by means of two screws. The valve shaft 6a is rotated by the step motor. The valve body 6b is formed partly with a cut-out portion 6c. As can be seen from FIG. 3, the opening of air flow control valve 6 becomes narrower, as the air flow control valve rotates toward the rotation direction closing of the valve 6. With air flow control valve 6 held at the narrow angular position, as can be appreciated from Bernoulli's theorem, it is possible to strengthen the fluid velocity of intake air flow due to the narrowed air flow passage defined between the inner wall of the intake port and the cut-out portion 6c. Some fuel injected or sprayed into intake port 2a when starting a cold engine, adheres to the inner wall surface of intake port 2a and to a side of the fillet of an intake valve (not shown). The wall fuel mass adhered to the intake port wall and to the fillet of the intake valve tends to flow along the port wall into the cylinder. The fuel mass flowing along the port wall into the cylinder is often called "wall fuel mass flow". During the cold engine starting, the wall fuel mass flow rate tends to increase. The stronger the intake air flow or the faster the intake air velocity, the greater the degree in which the fuel spray can be blown away, and therefore the less the wall fuel mass flow rate. As may be appreciated, the very high intake air velocity causes the liquid fuel film adhered to the port wall to be broken into very small droplets, and then the small droplets evaporate more readily. That is, air flow control valve 6 is effective to properly adjust the strength of intake air flow entering into the cylinder via the intake port by way of orifice constriction (the narrowed air flow passage defined between the inner wall of intake port 2a and cut-out portion 6c with movement of air flow control valve 6 in the valve closing direction), and whereby the wall fuel mass flow rate can be suitably adjusted or controlled. The strength of intake air flow exerts a great influence upon the behaviour of fuel sprayed or injected, that is, good evaporation of small droplets, good mixture distribution (good mixture blending), avoidance of air/fuel mixture maldistribution, avoidance of undesired wall wetting, and the like.

As shown in FIGS. 4A–4G, the opening of air flow control valve 6 can be controlled by means of ECU 21 in the stopped state of engine 1, and when starting a cold engine. Briefly, air flow control valve 6 operates as follows.

Figure 5:
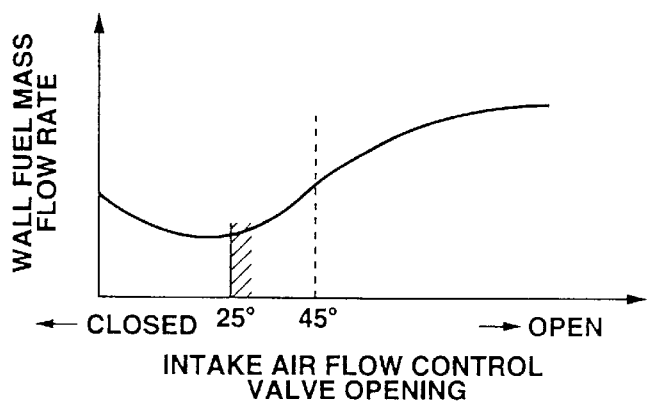
FIG. 5 is a test result showing the relationship between a valve opening of the intake air flow control valve and a wall fuel mass flow rate.
Figure 6:
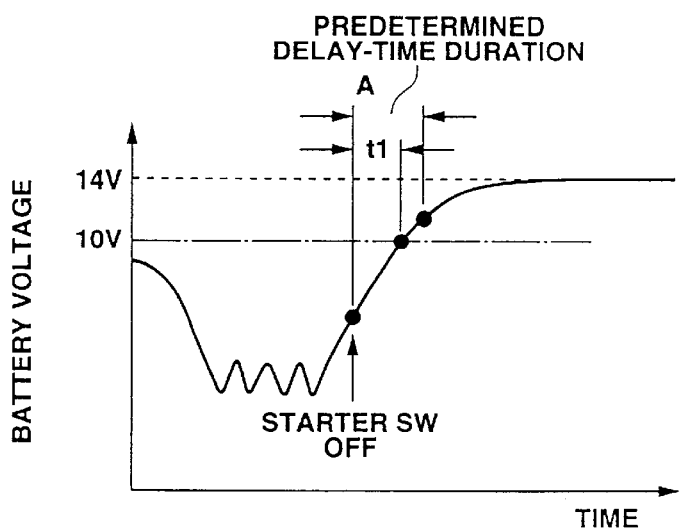
FIG. 6 is a graph showing a waveform of battery voltage change when the starter switch is turned on and then turned off during an engine-cranking operating mode at a starting period of the engine.

In the stopped state of engine 1, air flow control valve 6 is driven or moved to its predetermined intermediate valve-opening position. In the system of the embodiment, ECU 21 is designed to execute a so-called self-shutoff control according to which the engine is stopped after a predetermined process while maintaining an idling state of the engine after the ignition switch is turned from an ON state to an OFF state. After the self-shutoff operating mode has been completed, power supply to the microcomputer (ECU 21) is shut off and thus engine is automatically stopped. Therefore, during a period of time (i.e., self-shutoff period) from the start of the self-shutoff control to the end, air flow control valve 6 is driven or moved to the predetermined intermediate valve-opening position by means of step motor 7. The resetting of air flow control valve 6 to the predetermined intermediate valve-opening position at a time when the engine is stopped or during the self-shutoff control is very effective to avoid the step motor malfunction occurring owing to the insufficient battery voltage dropped down to a voltage level less than the previously-discussed step-motor operation assurance voltage. During the engine starting period, exactly, during the engine-cranking operating mode at the starting period, according to the control apparatus of the embodiment, operation of step motor 7 is inhibited by means of the ECU, and thus the air flow control valve 6 can be kept at the predetermined intermediate valve-opening position to which the air flow control valve has been reset or driven in advance during the engine stopping period or during the self-shutoff operating mode. Additionally, even during idling and during predetermined delay-time duration after the cranking operation has been completed or terminated, the system of the embodiment continues to inhibit the operation of step motor 7 and thus to keep air flow control valve 6 at the predetermined intermediate valve-opening position. During the idling after the predetermined delay time has expired, air flow control valve 6 is driven or rotated to its fully-closed position by means of the step motor. At this time, in order to rapidly activate the catalyst, the ECU also compensates for the ignition timing used at the idling period, so that the ignition timing is retarded as compared to a timing used during the predetermined delay-time duration. Thereafter, as soon as the catalyst has been brought into the activated state, air flow control valve 6 is driven to its full-open position by means of the step motor. For the reasons discussed below, air flow control valve 6 is driven to the predetermined intermediate valve-opening position in advance by the step motor during the engine stopping period or during the self-shutoff operating mode, and then retains kept at the intermediate valve-opening position (to which the air flow control valve has been reset in advance during the engine stopping period or during the self-shutoff control) by inhibiting operation of the step motor during cranking at the engine starting period. During cranking at the starting period, it is preferable to adjust the air flow control valve to the valve closing side that decreases the wall fuel mass flow rate. At the initial stages of various experiments which were assured by the inventors of the invention, the inventors have attempted to drive air flow control valve 6 from the full-open position to the fully-closed position during cranking at the starting period. In this case, rich misfire has taken place, thereby stalling the engine. Therefore, the inventors have studied how a wall fuel mass flow rate varies relative to an opening of air flow control valve 6. FIG. 5 is the test result showing the relationship between the wall fuel mass flow rate and air flow control valve opening. As can be seen from the test result shown in FIG. 5, the wall fuel mass flow rate varies based on a change in the air flow control valve opening. The inventors have investigated or analyzed that the previously-noted rich misfire has occurred due to an excessive time rate of change in the wall fuel mass flow rate, produced when the air flow control valve is closed rapidly. As described previously, during engine cranking at the starting period, a large amount of current flows from the storage battery to starter motor 40 via the drive circuitry of ECU 21, thus resulting in a remarkable drop in battery voltage. At this time, the battery voltage becomes less than the aforementioned step-motor operation assurance voltage, and thus it is difficult to move the air flow control valve to a desired valve-opening position accurately during cranking at the starting period. Sufficiently taking into account the undesirable drop in battery voltage less than the step-motor operation assurance voltage during the engine cranking, it is desirable and necessary to drive or move the air flow control valve to the predetermined intermediate valve-opening position suitable for the engine starting cranking period in advance, during the engine stopping period or during the self-shutoff control. As can be seen from the test result of FIG. 5, it is preferable to set the air flow control valve opening suitable for the engine starting cranking period to an opening corresponding to the valve closing side in which the wall fuel mass flow rate becomes less. As shown in FIG. 5, the valve opening that ensures the lowest wall fuel mass flow rate, is an opening substantially corresponding to the closed position of air flow control valve 6. However, if the engine is stopped under a particular condition in which the air flow control valve is set nearby the closed position, there is an increased tendency for the deposits to be formed or adhered on to the narrow portion between the air flow control valve and the port wall, thus resulting in a mechanical problem, such as a sticking air flow control valve, after termination of the starting cranking operation. Therefore, to avoid the problem of the sticking air flow control valve and the step-motor malfunction, it is desirable to set or drive the air flow control valve 6 at the predetermined intermediate valve-opening position corresponding to an intermediate valve opening, in advance by step motor 7 during the engine stopping period or during the self-shutoff control, and additionally to keep the air flow control valve at the predetermined intermediate position by inhibiting the step motor from operating during the engine starting cranking period. The aforementioned intermediate valve opening is preset to a predetermined opening at which there is no risk of the sticking air flow control valve due to the deposits during the engine stopping period and that ensures as small a wall fuel flow rate as possible during the starting cranking period. The inventors have experimentally studied the concrete numeric values of the predetermined intermediate opening of intake air flow control valve 6, as described hereunder. In setting the predetermined intermediate opening substantially midway between the fully closed position of air flow control valve 6 and the full-open position, the fully-closed position means a valve opening of 0°, whereas the full-open position means a valve opening of 90°. When the opening of air flow control valve 6 is set to approximately 45 degrees during the engine cranking, there is a slight possibility of engine stalling. Therefore, the air flow control valve opening has to be set to an opening less than 45°, that is, to the valve closing side that ensures a smaller wall fuel mass flow rate. When the air flow control valve opening is set to an opening below approximately 25°, there is an increased tendency for the air flow control valve to be stuck onto the port wall due to the deposits. Taking account of the test results discussed above, the predetermined intermediate opening of air flow control valve 6 is set to approximately 30 degrees. According to the system of the embodiment, the air flow control valve remains kept at the aforementioned predetermined intermediate opening during the predetermined delay-time duration from the time when the cranking has been completed. This is because the battery voltage does not so quickly recover to the specified voltage level such as a voltage of approximately 14 volts, even when the cranking operation has been completed. As clearly shown in FIG. 6, the battery voltage tends to rise with a rate of increase in voltage upon termination of the cranking operation (see the point A indicating the turned-off timing of the starter switch in FIG. 6). Note that at the point A, the battery voltage does not yet reach the predetermined step-motor operation assurance voltage such as a voltage of approximately 10 volts, indicated by the one-dotted horizontal line in FIG. 6. Thus, there is a delay-time duration t1 until the battery voltage reaches or recovers to the predetermined step-motor operation assurance voltage after switching from the ON state of the starter switch to the OFF state. During the above time-delay duration t1, it is not possible to assure the operation of step motor 7. As can be seen from FIG. 6, the sum of the time-delay duration t1 and a predetermined margin α is set or defined as a predetermined delay-time duration (t1+α). Thus, in order to insure the operation of step motor 7 and to avoid the problem of the sticking air flow control valve, the system of the embodiment functions to maintain the air flow control valve at the predetermined intermediate opening, during the predetermined delay-time duration (t1+α). And thereafter, as soon as the predetermined delay-time duration expires, the air flow control valve is driven or moved to the fully-closed position. This is because a comparatively large amount of unburnt hydrocarbons (HCs) are exhausted during idling just after cold engine starting, and it is necessary to purify the unburned HCs. In such a case, it is possible to improve the combusting condition of the engine by strengthening the intake air flow (high air flow velocity), thus reducing the density of HC emitted into the exhaust system. For the reasons set out above, the air flow control valve is rotated to the fully-closed position during idling just after engine starting.

Figure 7:
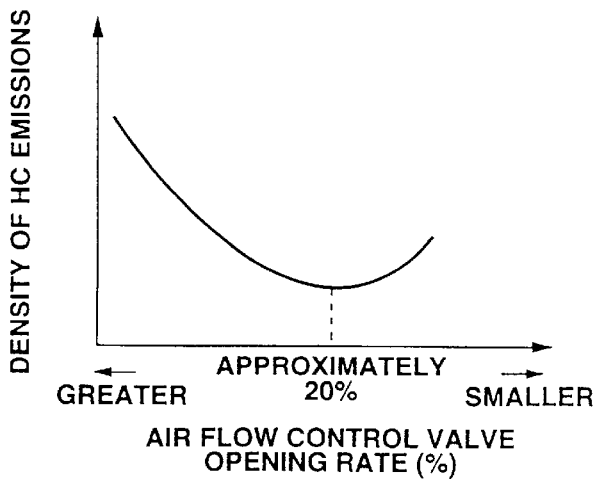
FIG. 7 is an experimental result showing the relationship between a rate of opening of the intake air flow control valve and unburned exhaust-gas hydrocarbons density.

Referring now to FIG. 7, there is shown the experimental result which was assured by the inventors of the invention, showing how the unburned HC emissions density varies relative to the air flow control valve opening rate. The air flow control valve opening rate (indicated in terms of percentage) is defined as a rate obtainable by dividing a cross-sectional area of the cut-out portion 6c of air flow control valve 6 by a port cross-sectional area of the intake port cut out at the installation position of air flow control valve 6. As can be seen from the characteristic curve of FIG. 7, the unburned HC density is the minimum at the air flow control valve opening rate of approximately 20%. In the system of the embodiment, the air flow control valve opening rate of approximately 20% is thus set as a predetermined valve opening substantially corresponding to the fully-closed state of air flow control valve 6. The valve opening corresponding to the minimum HC emissions density will be hereinafter referred to as a "predetermined substantially fully-closed-state opening". "FULLY-CLOSED POSITION" shown in FIG. 4A, means a position corresponding to the predetermined substantially fully-closed-state opening. During idling in which air flow control valve 6 is kept at the predetermined substantially fully-closed-state opening, an ignition timing optimally suitable for activation of catalyst 10 is defined as a "catalyst activation ignition timing". In the engine idling state after cranking operation has been terminated, it is very important and necessary to rapidly activate the catalyst. To achieve this, generally, the ignition timing is retarded. During idling, in order to reduce the unburned HC emissions and thus to improve the combusting condition, the air flow control valve is set and kept at the predetermined substantially fully-closed-state opening and the intake-air flow is effectively strengthened. Thus, the ignition timing can be retarded while keeping good combustion. The ignition timing retard results in a rise in exhaust temperature. For the reasons set out above, an ignition timing which is set to be suitable for the idling period during which the air flow control valve is set at the predetermined substantially fully-closed opening, is compensated for in a timing-retard direction as compared to an ignition timing which is set to be suitable for the idling period during the previously-noted predetermined delay-time duration (t1+α). Thereupon, for a brief moment (during the predetermined delay-time period (t1+α)) after complete explosion, there is less possibility that the vehicle is accelerated with the accelerator pedal depressed. That is, the ignition timing set during the delay-time duration corresponds to the idling-period ignition timing. The operation of air flow control valve 6 is also limited due to the driving speed of step motor 7. As clearly shown in FIG. 4A, the air flow control valve tends to move to the predetermined substantially fully-closed-state opening with a constant gradient (a response delay corresponding to a constant time rate of change in the air flow control valve opening). During a transition from the predetermined intermediate valve-opening position of air flow control valve 6 to the predetermined substantially fully-closed-state opening, the ignition timing has to be set or determined depending on a change in the air flow control valve opening, so that the ignition timing retard correction value increases as the air flow control valve opening approaches to the predetermined substantially fully-closed-state opening. On the other hand, the cranking-period ignition timing (the ignition timing suitable for the cranking period) tends to slightly vary depending on changes in engine speed, but can be regarded as a substantially constant value. When the cranking speed is low (for example, during cranking at 200 through 250 rpm), there is a less difference between the intake air quantity obtained at the full-open position of air flow control valve 6 and the intake air quantity obtained at the intermediate valve-opening position. For the reasons discussed above, the cranking-period ignition timing can be set to a timing which is set to be suitable for the unthrottled state (full-open position) of air flow control valve 6. Additionally, according to the system of the embodiment, the cranking-period ignition timing is retarded in comparison with the ignition timing used during the predetermined delay-time duration or during idling. This is because the timing retard is effective to avoid excessive preignition.

Figure 8:
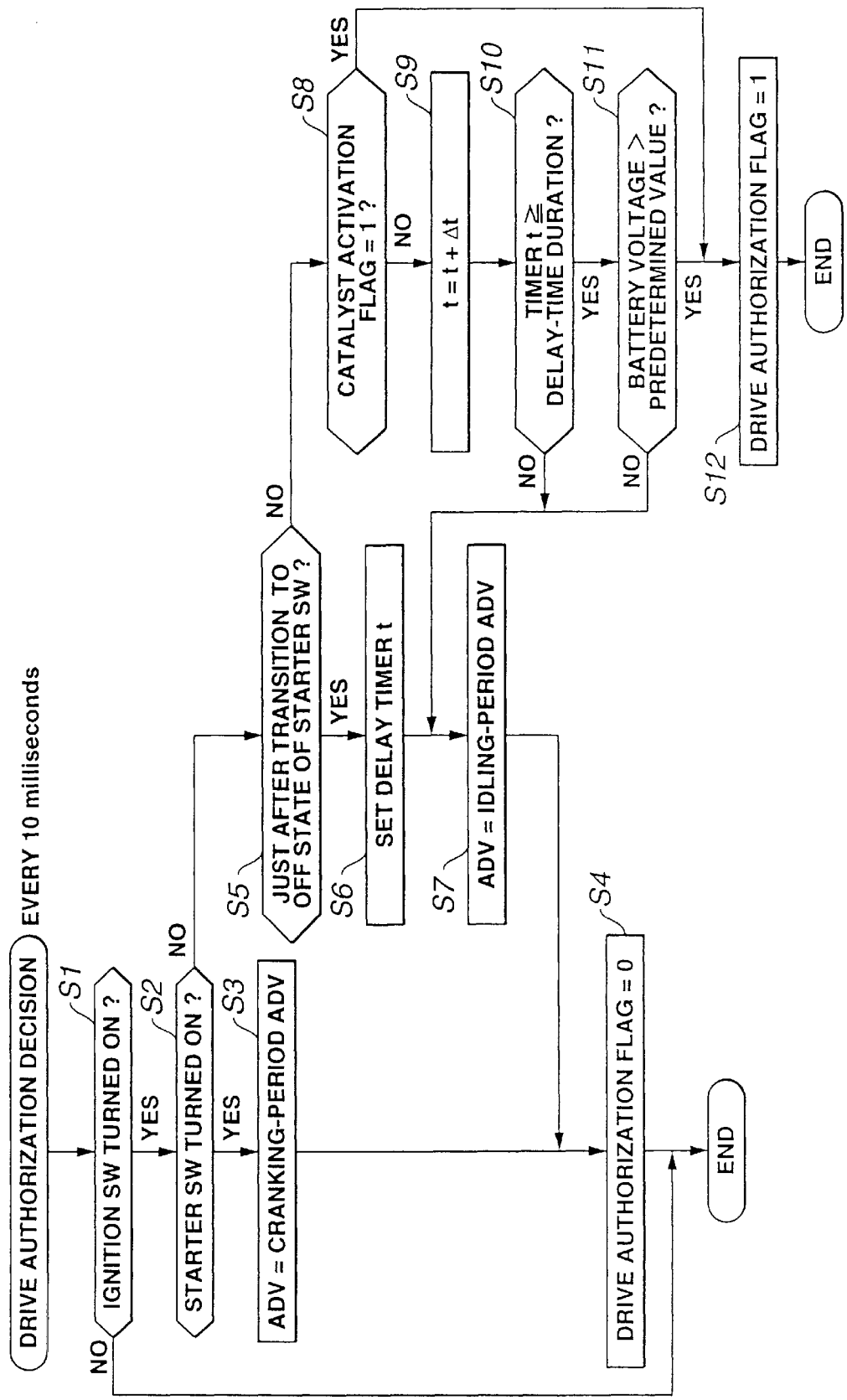
FIG. 8 is a flow chart showing a sub-routine for setting and resetting of a drive authorization flag that enables or inhibits operation of the intake air flow control valve.

Referring now to FIG. 8, there is shown the drive authorization decision routine needed to set or reset a drive authorization flag that enables or inhibits the operation of air flow control valve 6. The sub-routine shown in FIG. 8 is executed as time-triggered interrupt routines to be triggered every predetermined time intervals such as 10 milliseconds.

At step S1, a check is made to determine whether ignition switch 25 is turned on. Also, at step S2, a check is made to determine whether starter switch 26 is turned on. When the ignition switch and the starter switch are both turned on, that is, during engine cranking at the starting period, the routine proceeds to step S3. At step S3, the cranking-period ignition timing is set as the ignition timing command value ADV. The ignition timing command value ADV is indicated in terms of a crank angle which is measured in the timing-advance direction from top dead center (TDC) on compression stroke which TDC is used as a reference position. The greater the ignition timing command value ADV means that the ignition timing is greatly shifted in the timing-advance direction. The cranking-period ignition timing is almost constant. Exactly speaking, the cranking-period ignition timing slightly varies depending on changes in engine speed Ne. Thereafter, at step S4, a drive authorization flag is reset to "0". In this manner, one cycle of the drive authorization decision routine terminates. As described above, when the drive authorization flag is reset, the step motor is deenergized and thus operation of air flow control valve 6 is inhibited. That is, during cranking at the engine starting period, the operation of air flow control valve 6 is inhibited, and thus remains kept at the predetermined intermediate valve-opening position to which the air flow control valve has been driven by means of the step motor in advance during the previous engine stopping period. Returning to steps S1 and S2, when the ignition switch is turned on and the starter switch is turned off, the routine proceeds from step S2 to step S5. At step S5, a test is made to determine whether the ignition switch has been just turned off. Just after the transition from the ON state of ignition switch 25 to OFF state, ECU 21 determines that the cranking operation has been just terminated. When the answer to step S5 is in the affirmative (YES), step S6 occurs. At step S6, the delay timer of ECU 21 is set, that is, the delay timer is temporarily reset to "0" and then started. At step S7, the idling-period ignition timing is set as the ignition timing command value ADV. After this, the routine proceeds to step S4 to reset the drive authorization flag. The delay timer of step S6 is provided to measure or count a delay period or a delay-time duration representing the time allowed for the step motor 7 to drive the air flow control valve 6. In a conventional manner, the idling-period ignition timing is preprogrammed or predetermined based on both the engine temperature (coolant temperature Tw) as well as engine speed Ne. From the next cycle, the routine proceeds from step S2 through step S5 to step S8. At step S8, a check is made to determine whether catalyst 10 is conditioned in its activated state. The catalyst activation decision is made on the basis of a catalyst activation flag which can be set through the routine shown in FIG. 9 which will be fully described hereunder.

Figure 9:
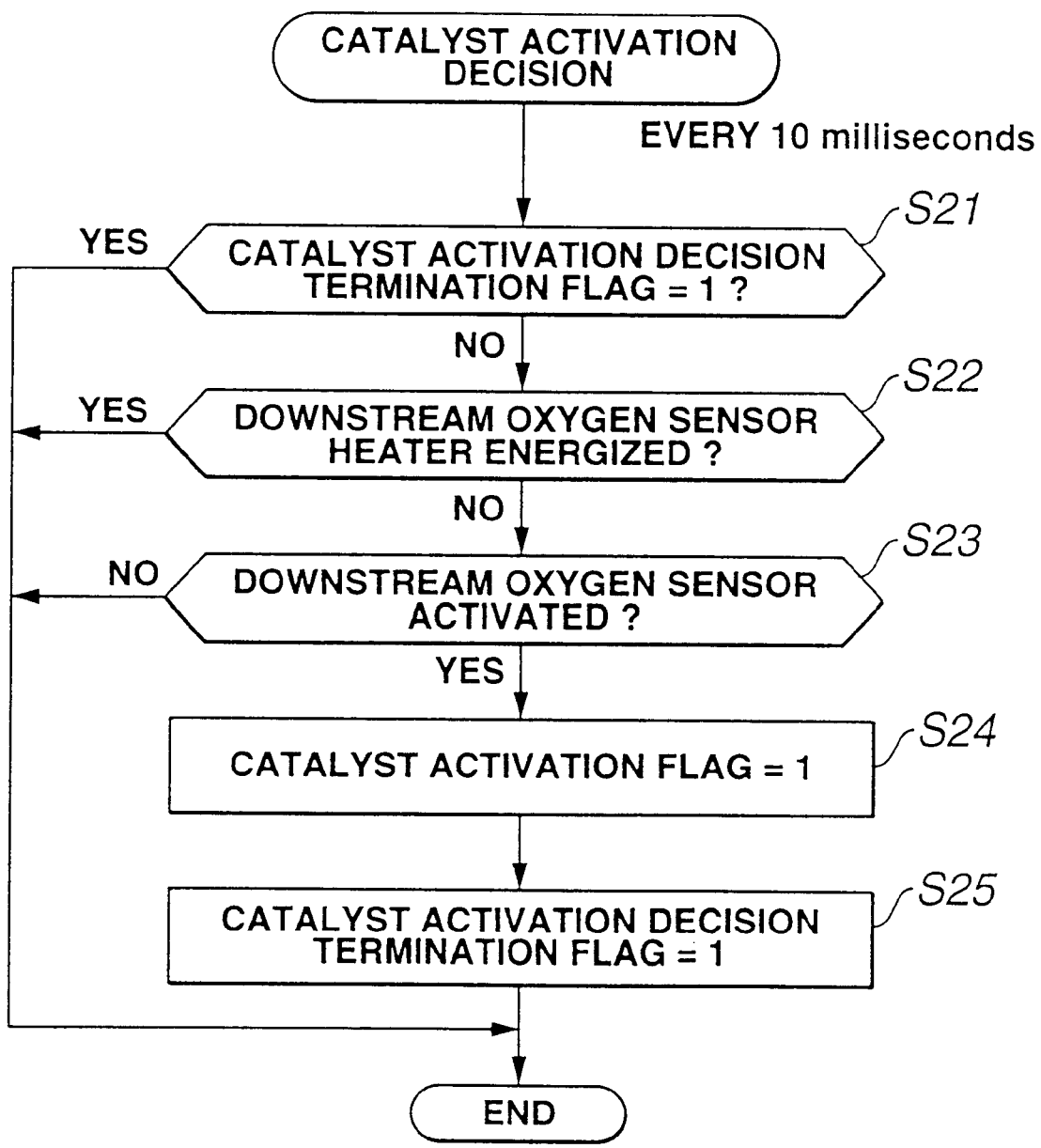
FIG. 9 is a flow chart showing a sub-routine used to determine whether the catalyst is activated or deactivated.

As can be seen from the catalyst activation decision routine shown in FIG. 9, the activated state of the catalyst is estimated or determined on the basis of the activated state of downstream oxygen sensor 28, because the activated state of downstream oxygen sensor 28 can be regarded as the activated state of catalyst 10.

At step S21 of FIG. 9, a check is made to determine whether a catalyst activation decision termination flag is set (=1) or reset (=0). As soon as the ignition switch is turned on, the processor of ECU 21 begins to initialize various data stored in the memory. After initialization, the catalyst activation decision termination flag is reset to "0". Thus, when the sub-routine of FIG. 9 is started after the data initialization, the catalyst activation decision termination flag remains reset. That is, just after the initialization, the routine flows from step S21 to step S22. At step S22, a check is made to determine whether the downstream oxygen sensor heater is energized. At step S23, a check is made to determine whether the downstream oxygen sensor is conditioned in the activated state. Only when the downstream oxygen sensor heater is deenergized and additionally the downstream oxygen sensor has been already activated, the routine proceeds to step S24. At step S24, the processor of ECU 21 determines that the catalyst becomes activated, and then sets the catalyst activation flag to "1". When the answer to step S22 is affirmative (YES), that is, when the sensing element of downstream oxygen sensor 28 is heated by the downstream oxygen sensor heater, the system of the embodiment inhibits the catalyst activation decision. This is because the heating action exerts a bad influence upon the accuracy of catalyst activation decision. In the shown embodiment, the energizing and deenergizing of the downstream oxygen sensor heater are controlled properly, so that the downstream oxygen sensor is maintained at the activated state at all times when the engine is running. For this reason, step S22 is required for the heated type of oxygen sensor. In other words, there is no necessity of step S22, in case of the use of an unheated exhaust oxygen sensor. As the method of determining or deciding as to whether the oxygen sensor is conditioned in the activated state, a conventional method can be used. For instance, in a heated type of oxygen sensor whose sensor output is an initial voltage level V0 during a cold engine start and tends to gradually rise with a temperature rise in the sensing element due to heating action of the heating element, ECU 21 determines that the oxygen sensor becomes activated when the heated oxygen sensor output exceeds a predetermined criterion voltage level (V0+dVR). In contrast to the above, in a heated type of oxygen sensor whose sensor output is an initial voltage level V0 during a cold engine start and tends to gradually fall with a temperature rise in the sensing element due to heating action of the heating element, the ECU determines that the oxygen sensor becomes activated when the heated oxygen sensor output exceeds a predetermined criterion voltage level (V0−dVL). Returning to the flow chart of FIG. 9, after step S24, step S25 occurs. At step S25, in order to execute only one catalyst activation decision, the catalyst activation decision termination flag is set to "1". The setting of the catalyst activation decision termination flag to "1", inhibits the routine from flowing from step S21 to step S22. Calculation results of the catalyst activation decision termination flag and the catalyst activation flag are stored in the memory (RAM) of ECU 21.

Returning to FIG. 8, at step S8, the more recent data of the catalyst activation flag is read and then a test is made to determine whether the catalyst activation flag is set to "1". When the catalyst activation flag is reset (=0), that is, when the catalyst is not yet activated, the routine proceeds from step S8 to step S9. At step S9, the counted value of the delay timer is incremented by a predetermined value $\Delta t$ (that is, $t=t+\Delta t$). Thereafter, at step S10, the counted value of the delay timer is compared to the predetermined delay time period. As discussed above, the sum $(t1+\alpha)$ of the predetermined margin $\alpha$ and the delay-time duration t1 needed until the battery voltage recovers to the predetermined step-motor operation assurance voltage after switching from the ON state of the starter switch to the OFF state, is set as the predetermined delay time period (see FIG. 6). When the answer to step S10 is negative (NO), that is, when the counted value of the delay timer is less than the predetermined delay time duration $(t1+\alpha)$, the battery voltage does not yet recover to the predetermined step-motor operation assurance voltage level. Thus, the routine flows from step S10 via step S7 to step S4. Only upon expiration of the predetermined delay time duration $(t1+\alpha)$, the routine proceeds from step S10 to step S11. At step S11, a check is made to determine whether the more recent battery voltage data exceeds the predetermined voltage level (the predetermined step-motor operation assurance voltage level such as approximately 10 volts). The delay timer is merely used to estimate the rising state of the battery voltage. Therefore, a comparison check (step S11) between the actual battery voltage monitored and the predetermined step-motor operation assurance voltage level is necessary to more accurately determine whether the actual battery voltage reaches the predetermined step-motor operation assurance voltage level. When the answer to step S11 is negative (NO), that is, when the more recent battery voltage data is below the predetermined step-motor operation assurance voltage level, the routine flows from step S11 via step S7 to step S4. When the answer to step S11 is affirmative (YES), that is, when the more recent battery voltage data exceeds the predetermined step-motor operation assurance voltage level, the routine proceeds from step S11 to step S12, so as to drive the air flow control valve to the predetermined substantially fully-closed-state opening. Through the flow from step S11 to step S12, the drive authorization flag is set so as to enable the operation of air flow control valve 6 with the step motor energized and thus to drive the air flow control valve to the predetermined substantially fully-closed-state opening. The calculation result of drive authorization flag is also stored in the predetermined memory address of the computer memory (RAM). Returning to step S8, when the catalyst activation flag is set, that is, when the catalyst is conditioned in the activated state, the routine jumps from step S8 directly to step S12, so as to set the drive authorization flag to "1", and thus to enable the operation of air flow control valve 6 with the step motor energized, thereby allowing the air flow control valve to be moved to the full-open position.

Figure 10:
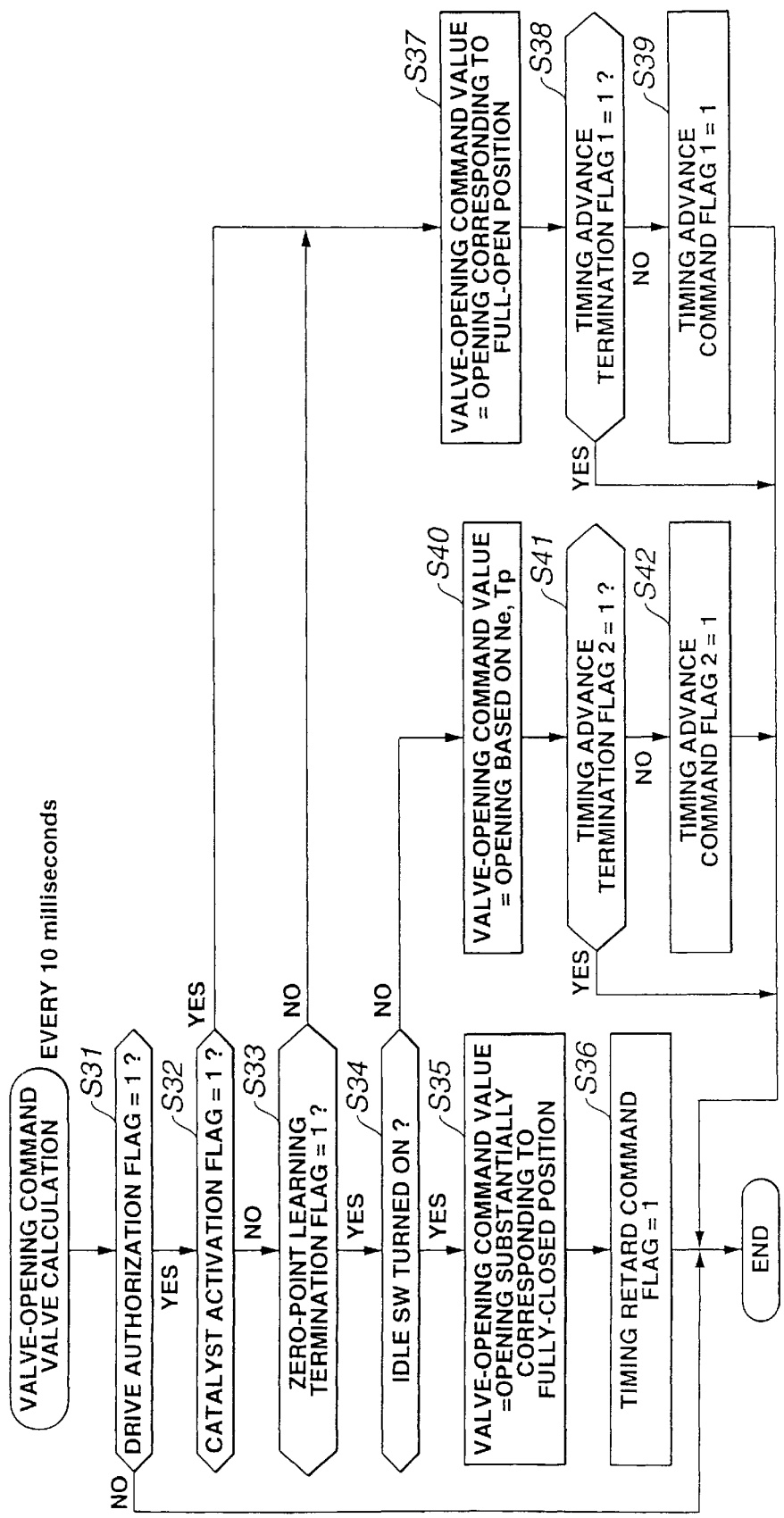
FIG. 10 is a flow chart showing a sub-routine for arithmetic operation of a valve-opening command value of the air flow control valve after expiration of a predetermined delay-time duration.
Figure 11:
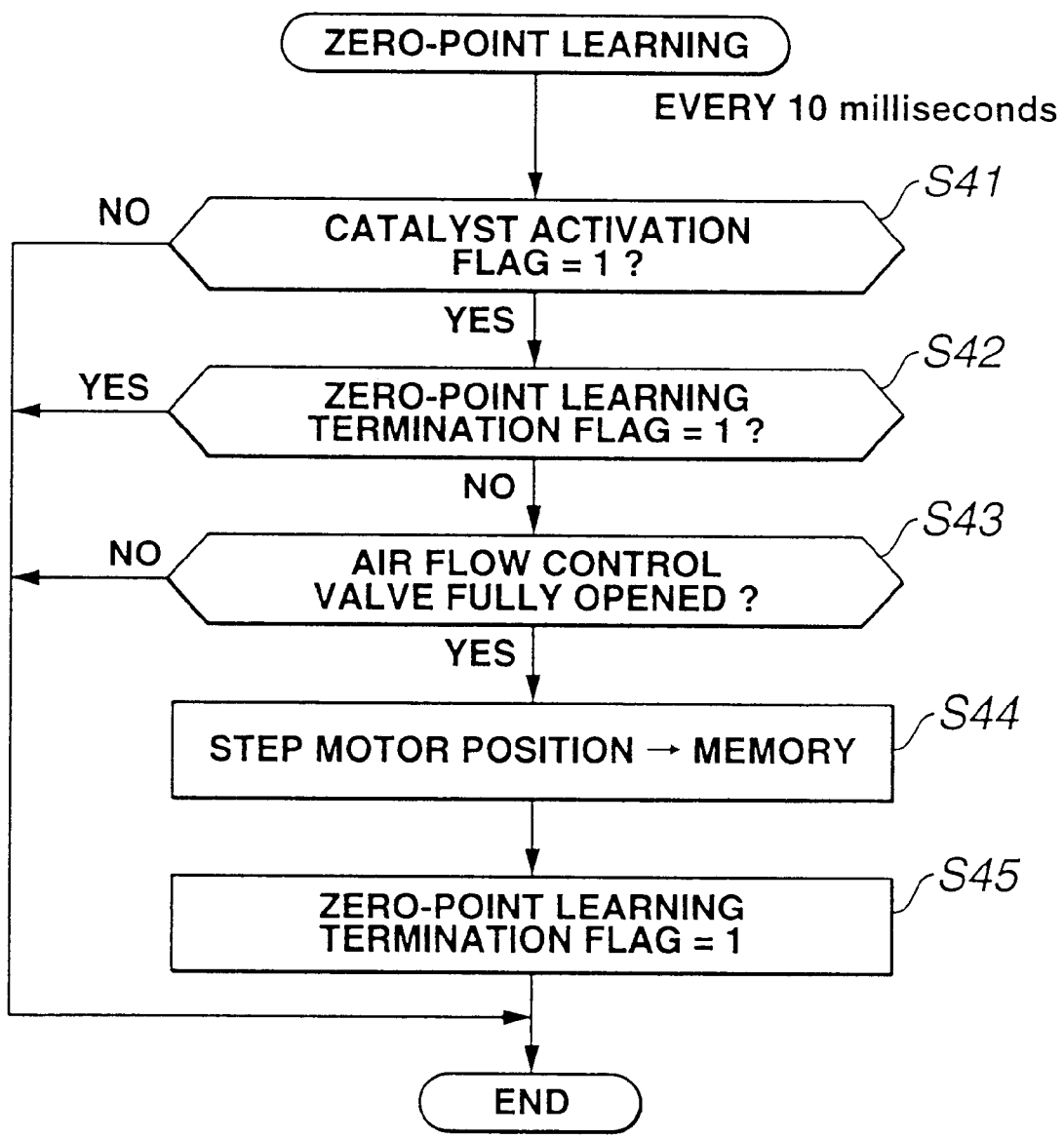
FIG. 11 is a flow chart showing a sub-routine for a so-called zero-point learning.

Referring now to FIG. 10, there is shown the arithmetic processing for the valve-opening command value of air flow control valve 6. This routine shown in FIG. 10 is executed for arithmetically calculating the valve-opening command value after the predetermined delay time duration (t1+α) has expired. The routine of FIG. 10 is also executed as time-triggered interrupt routines to be triggered every predetermined time intervals such as 10 milliseconds.

At step S31, a check is made to determine whether the drive authorization flag is set to "1". When the drive authorization flag is set, the routine proceeds to step S32. At step S32, a check is made to determine whether the catalyst activation flag is set to "1". When the catalyst activation flag is reset to "0", and thus the catalyst is still deactivated, the routine flows from step S32 to step S33. At step S33, a check is made to determine whether a zero-point learning termination flag is set to "1". The above-mentioned term "zero-point learning" means that the processor of ECU 21 memorizes the angular position of step motor 7 obtained with the air flow control valve kept at its full-open position. Exactly speaking, the angular position (the zero point) of step motor 7 means the number of angular steps which are obtained electromagnetically with the air flow control valve kept at the full-open position and which correspond to a controlled variable for the control system of step motor 7. The full-open position of air flow control valve 6 tends to slightly vary due to an installation error of the air flow control valve itself. So, the zero-point learning is necessary to eliminate the installation error of air flow control valve 6. In the absence of the zero-point learning, the following troubles may take place. When a valve-opening command signal corresponding to the predetermined substantially fully-closed-state opening is output to the step motor, the air flow control valve tends to be somewhat offset from the "FULLY-CLOSED POSITION" corresponding to the predetermined substantially fully-closed-state opening. For example, when the air flow control valve is slightly offset from the normal "FULLY-CLOSED POSITION" in a rotation direction opening of air flow control valve 6 owing to the installation error of air flow control valve 6, as a matter of course, the "INTERMEDIATE VALVE-OPENING POSITION" and the "FULLY-CLOSED POSITION", both shown in FIG. 4A, tend to be somewhat offset from their normal positions in the rotation direction opening of air flow control valve 6. In such a case, during engine cranking, the actual opening of air flow control valve 6 becomes somewhat greater than the desired opening, thus slightly increasing the wall fuel mass flow rate. Owing to the undesiredly greater opening of air flow control valve 6, results in a decrease in the fluid velocity of intake air flowing through air flow control valve 6 after the predetermined delay-time duration has expired. This deteriorates the combusting condition. Conversely, when the air flow control valve is slightly offset from the normal "FULLY-CLOSED POSITION" in a rotation direction closing of air flow control valve 6 owing to the installation error of air flow control valve 6, the "INTERMEDIATE VALVE-OPENING POSITION" and the "FULLY-CLOSED POSITION", both shown in FIG. 4A, tend to be somewhat offset from their normal positions in the rotation direction closing of air flow control valve 6. In this case, during the engine stopping period, the air flow control valve tends to be further closed from the predetermined intermediate valve-opening position. This may promote formation of deposits adhered onto the narrow portion between the air flow control valve and the port wall. Also, when the predetermined delay-time duration has expired, the inaccurate opening of air flow control valve 6 may deteriorate the combusting condition. To avoid the problems as discussed above, the zero-point learning is very useful and necessary. Details of setting of the zero-point learning termination flag of step 33 shown in FIG. 10 are hereinafter described in detail in reference to the flow chart shown in FIG. 11. The zero-point learning operation is executed once under a particular condition in which the ECU determines that the catalyst has been activated (that is, the catalyst activation decision termination flag has been set through the routine of FIG. 9), and additionally the air flow control valve has been driven or moved to the full-open position (see the flow from step S32 to S37 in FIG. 10). First, at step S41, a check is made to determine whether the catalyst activation flag is set to "1". Second, at step S42, a check is made to determine whether the zero-point learning termination flag is set to "1". And then, at step S43, a check is made to determine whether air flow control valve 6 is kept at the full-open position (that is, the valve-opening command signal value corresponding to the full-open position of air flow control valve 6 is output). The zero-point learning flag is set to "0" at the point of time of factory shipments. Only when the answer to step S41 is affirmative (that is, the catalyst activation is completed and thus the catalyst activation flag is set), the answer to step S42 is negative (that is, the zero point of step motor 7 is not yet learned and thus the zero-point learning termination flag is reset to "0"), and the answer to step S43 is affirmative (that is, the air flow control valve is kept at the full-open position), the routine proceeds to step S44. At step S44, the current step-motor angular position (corresponding to the zero point of step motor 7), which is obtained under the particular condition wherein the catalyst activation flag is set and the air flow control valve is kept at the full-open position, is stored in the predetermined memory address of the RAM. Then, at step S45, the zero-point learning termination flag is set to "1". The step-motor zero point stored in the RAM is transferred to and memorized by way of a nonvolatile storage memory during the engine stopping period, in order to prevent the step-motor zero point from being eliminated after the engine has been stopped. The step-motor zero point stored in the nonvolatile storage memory can be repeatedly used each time the engine is started after the first engine starting. As set forth above, the zero-point learning is not yet initiated during the first engine starting after factory shipments. Thus, the air flow control valve is driven to the full-open position once after the first engine starting, and at this time the angular position of step motor 7 is stored as the zero point of step motor 7 in the RAM of ECU 21. In the system of the embodiment, the actual opening of air flow control valve 6 (exactly, the step-motor angular position) is detected by means of the position sensor 30 (see FIG. 1).

Returning to step S33 of FIG. 10, when the answer to step S33 is affirmative (YES), that is, the zero-point learning termination flag has already been set to "1", the routine proceeds from step S33 to step S34. At step S34, a check is made to determine whether the idle switch is turned on. When the answer to step S34 is affirmative (YES), step S35 occurs. At step S35, the valve-opening command value is set to the predetermined substantially fully-closed-state opening. In response to the valve-opening command corresponding to the predetermined substantially fully-closed-state opening, air flow control valve 6 is shifted to the predetermined substantially fully-closed-state opening at a controlled driving speed or a predetermined driving speed. The method of controlling the drive speed of the air flow control valve forms no part of the present invention, and thus details of the drive-speed control of air flow control valve 6 is omitted for the sake of simplicity of the disclosure. Thereafter, the routine flows from step S35 to step S36. At step S36, a timing retard command flag is set to "1", so as to initiate the arithmetic calculation (for the ignition timing command value ADV) shown in FIG. 12 which will be fully described hereunder.

Figure 12:
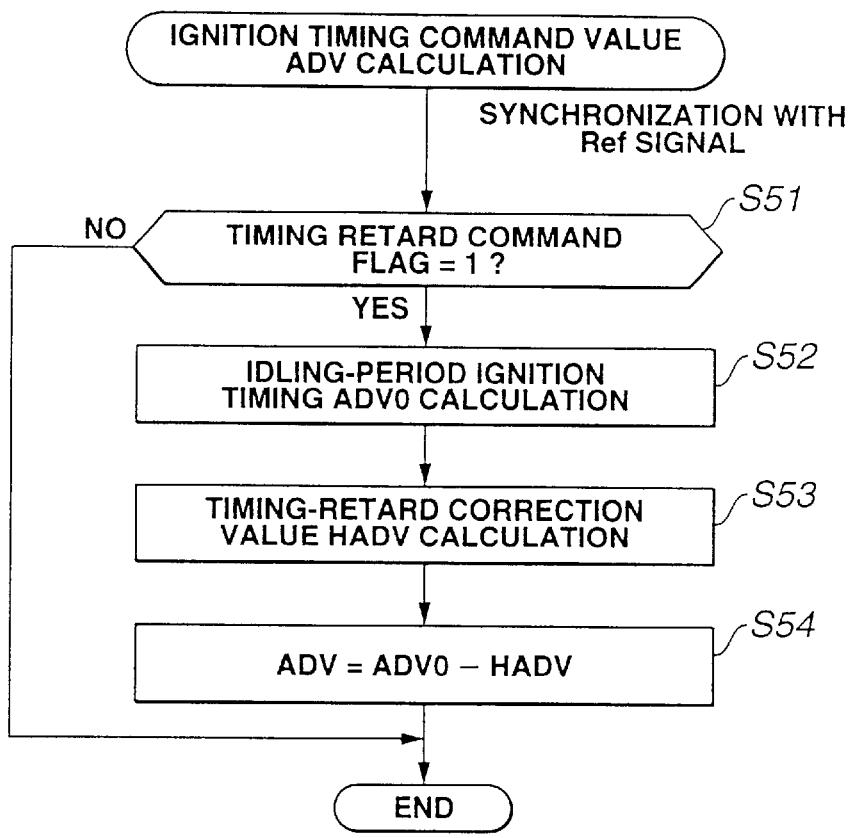
FIG. 12 is a flow chart showing a sub-routine for arithmetic operation of an ignition timing command value ADV suitable for ignition timing retard.
Figure 13:
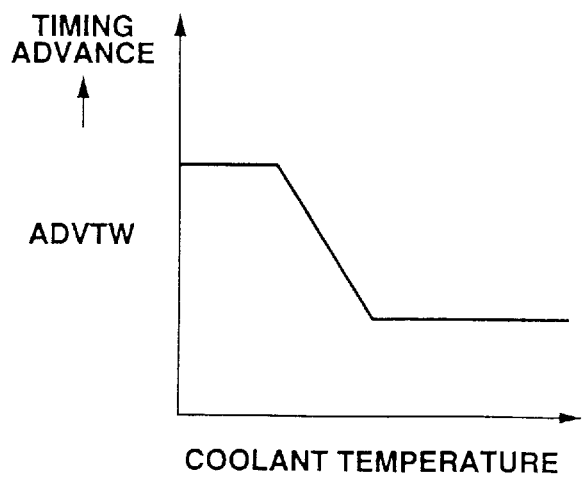
FIG. 13 is a predetermined engine coolant temperature Tw versus basic ignition timing ADVTW characteristic map during idling.
Figure 14:
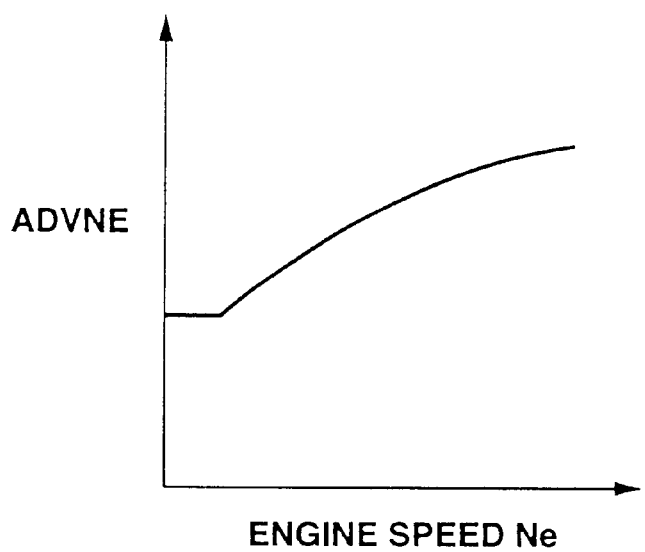
FIG. 14 is a predetermined engine speed Ne versus engine speed correction value ADVNE characteristic map.
Figure 15:
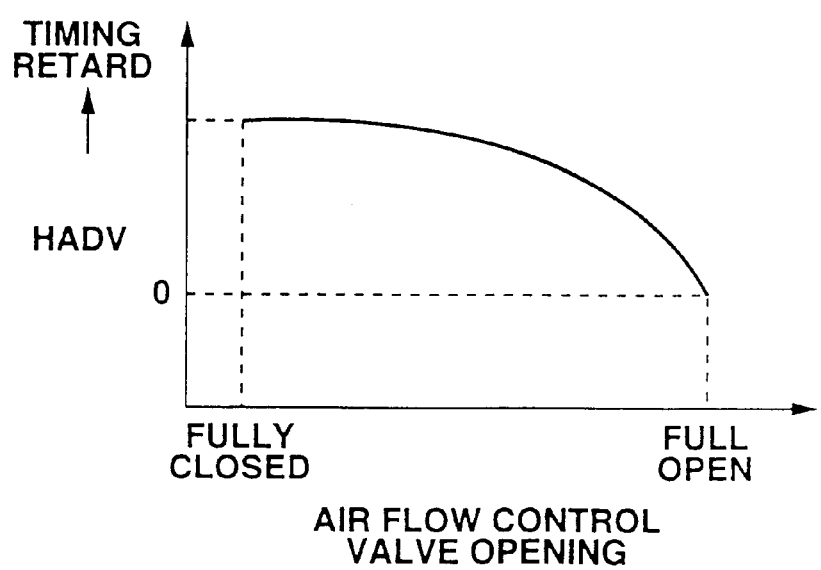
FIG. 15 is a predetermined intake air flow control valve opening versus ignition timing retard correction value HADV characteristic map.
Figure 16:
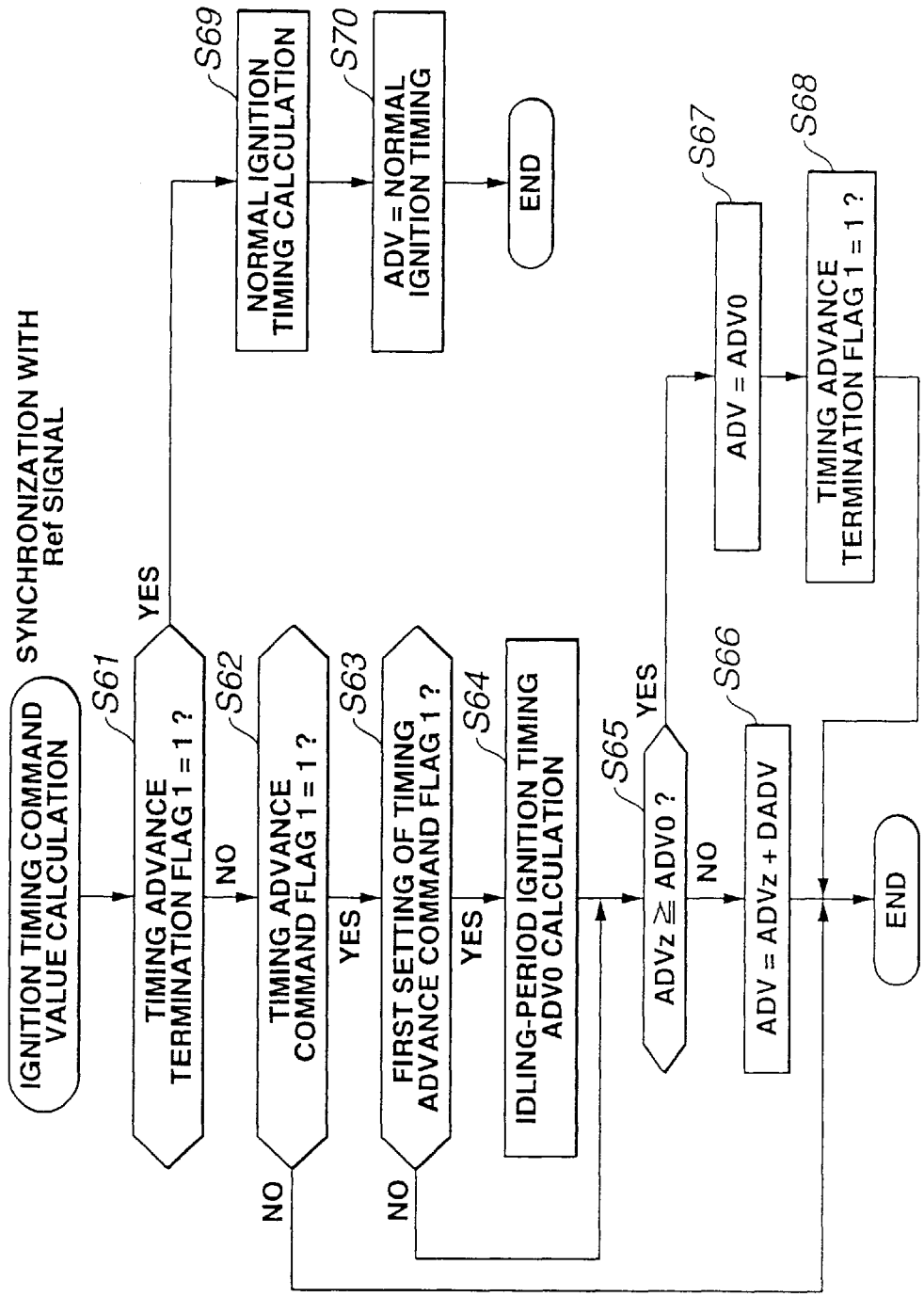
FIG. 16 is a flow chart showing a sub-routine for arithmetic operation of an ignition timing command value ADV suitable for ignition timing advance.

Referring to FIG. 12, there is shown the arithmetic processing for the ignition timing command value ADV (suitable for timing retard) based on the valve-opening command value computed through the arithmetic processing of FIG. 10. The routine shown in FIG. 12 is executed as interrupt routines to be triggered in synchronization with the Ref signal input. At step S51, a check is made to determine whether the timing retard command flag is set to "1". When the answer to step S51 is affirmative (YES), step S52 occurs. At step S52, the idling-period ignition timing ADV0 is calculated. In a conventional manner, the idling-period ignition timing ADV0 is computed or retrieved on the basis of the engine temperature (coolant temperature Tw) and engine speed Ne. Concretely, a basic ignition timing ADVTW suitable for the idling period is first retrieved based on the more recent coolant temperature data Tw from the predetermined engine coolant temperature Tw versus basic ignition timing ADVTW characteristic map shown in FIG. 13. Second, an engine speed correction value ADVNE is retrieved based on the more recent engine speed data Ne from the predetermined engine speed Ne versus engine speed correction value ADVNE characteristic map shown in FIG. 14. The idling-period ignition timing ADV0 is computed as the sum (ADVTW+ADVNE) of the basic ignition timing ADVTW and the engine speed correction value ADVNE. Thereafter, at step S53, an ignition timing retard correction value HADV is computed or retrieved based on the more recent air flow control valve opening data from the predetermined intake air flow control valve opening versus ignition timing retard correction value HADV characteristic map shown in FIG. 15. After this, the routine proceeds from step S53 to step S54. At step S54, the ignition timing command value ADV is computed as a difference (ADV0−HADV) obtained by subtracting the timing retard correction value HADV from the idling-period ignition timing ADV0. As can be seen from the characteristic map shown in FIG. 15, the timing retard correction value HADV is preprogrammed to increase with a decrease in the air flow control valve opening, for the reasons set out below. That is, the fluid flow velocity of intake air flowing through the intake port becomes faster with a decrease in the air flow control valve opening. The higher intake air flow velocity improves the combusting condition, and therefore the ignition timing can be compensated for in the timing-retard direction to some degree. The ignition timing retardation results in an exhaust temperature rise, thus promoting catalyst activation. Assuming that the timing retard correction value is set to a predetermined value HADV1 when the air flow control valve is kept at the predetermined substantially fully-closed-state opening, the difference (ADV0−HADV1) between the idling-period ignition timing ADV0 and the predetermined timing retard correction value HADV1 corresponds to the catalyst-activation ignition timing, that is, the "CATALYST-ACTIVATION ADV" shown in FIG. 4D. The "CATALYST-ACTIVATION ADV" shown in FIG. 4D is effective to rapidly activate catalyst 10. In this manner, after the catalyst has been efficiently activated, the routine of FIG. 10 proceeds from step S32 to step S37. At step S37, the valve-opening command value is set to an opening corresponding to the full-open position. Also, when the catalyst activation is not completed and additionally the zero-point learning does not yet terminate, the routine proceeds from step S32 via step S33 to step S37. In response to the valve-opening command corresponding to the full-open position, the air flow control valve is shifted to the opening corresponding to the full-open position at a controlled driving speed or a predetermined driving speed. Thereafter, in order to compute the ignition timing command value ADV based on the valve-opening command value corresponding to the full-open position, the routine proceeds from step S37 to step S38. At step S38, a check is made to determine whether the timing advance terminates. Only when a timing advance termination flag 1 is reset to "0" and thus the timing advance does not yet terminate, the routine proceeds from step S38 to step S39. At step S39, a timing advance command flag 1 is set to "1". In this manner, as soon as the timing advance command flag 1 is set, the ignition timing command value ADV suitable for timing advance is computed in accordance with the flow chart shown in FIG. 16. The routine shown in FIG. 16 is also executed as interrupt routines to be triggered in synchronization with the Ref signal input. At step S61, a check is made to determine whether the timing advance termination flag 1 is set to "1". Before the timing advance, as a matter of course, the timing advance termination flag 1 is reset to "0". The routine flows from step S61 to step S62. At step S62, a check is made to determine whether the timing advance command flag 1 is set to "1". When the timing advance command flag 1 is set, step S63 occurs. At step S63, a check is made to determine whether this setting of timing advance command flag 1 is the first setting. If the timing advance command flag 1 is changed from the reset state (=0) to the set state (=1) at the current cycle, the ECU determines that this setting of timing advance command flag 1 to "1" is the first setting. Thus, the routine flows from step S63 to step S64. At step S64, the idling-period ignition timing ADV0 is calculated. Thereafter, at step S65, a previous value ADVz of the ignition timing command value is compared to the idling-period ignition timing ADV0. That is, a check is made to determine whether the previous value ADVz of the ignition timing command value is greater than or equal to the idling-period ignition timing ADV0. At this timing, the catalyst-activation ignition timing (ADV0−HADV1) is usually set as the previous value ADVz of the ignition timing command value. Therefore, the previous value ADVz is less than the idling-period ignition timing ADV0. In case of ADVz<ADV0, the routine proceeds from step S65 to step S66. At step S66, the sum (ADVz+DADV) of the previous value ADVz and a predetermined value DADV is set as the current ignition timing command value ADV (see the expression ADV=ADVz+DADV in step S66).

That is, the ignition timing is advanced from the previous value ADVz by the predetermined value DADV. From the next cycle, the routine jumps from step S63 to step S65. The timing-advance process of step S66 is repeatedly executed until the previous value ADVz becomes above the idling-period ignition timing ADV0. As soon as the previous value ADVz becomes above the idling-period ignition timing ADV0, the routine flows from step S65 to step S67. At step S67, the idling-period ignition timing ADV0 is set as the ignition timing command value ADV, that is, ADV=ADV0. In this manner, the timing-advance operating mode from the catalyst-activation ignition timing (ADV0–HADV1) to the idling-period ignition timing (ADV0) terminates. Therefore, at step S68, the timing advance termination flag 1 is set to "1". After the timing advance termination flag 1 has been set to "1", the routine flows from step S61 to step S69. At step S69, a normal ignition timing is calculated. Then, at step S70, the normal ignition timing is set as the ignition timing command value ADV.

Figure 17:
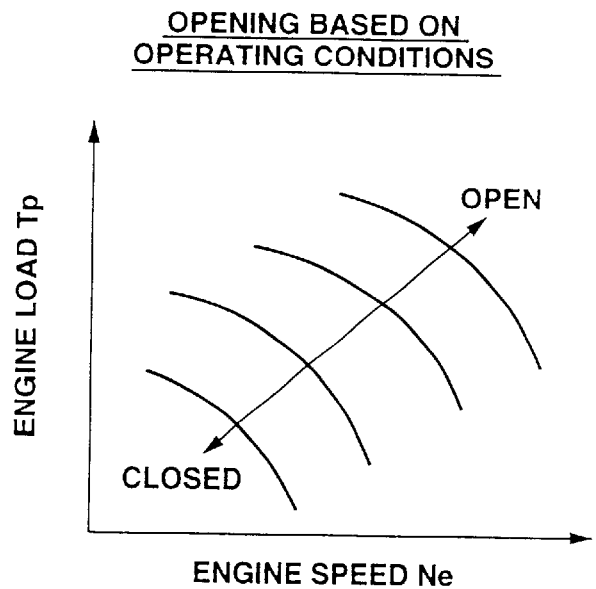
FIG. 17 is a predetermined characteristic map showing the relationship among engine operating conditions (engine speed Ne, basic fuel-injection pulse width (basic injection pulse duration) Tp regarded as engine load), and the intake air flow control valve opening.

Returning again to FIG. 10, when the catalyst remains deactivated (the catalyst activation flag is reset) and additionally the idle switch is turned off, the routine proceeds from step S34 to step S40. At step S40, an opening based on both engine speed Ne and engine load (i.e., basic fuel-injection pulse width Tp) is set as the valve-opening command value of air flow control valve 6. Responsively to the transition from the turned-on state of idle switch 29 to the turned-off state, ECU 21 determines that there is a demand for vehicle acceleration. If the air flow control valve is maintained at the predetermined substantially fully-closed-state opening in presence of a demand for quick acceleration, there is a possibility of lack of the engine torque output. The engine operating conditions such as engine speed Ne and engine load (Tp) are parameters representative of a degree of acceleration requirement. Thus, at step S40, the valve-opening command value is computed as the opening based on both engine speed Ne and engine load Tp (see the characteristic map shown in FIG. 17). In response to the valve-opening command corresponding to the opening retrieved or computed based on the engine operating conditions Ne and Tp from the predetermined characteristic map, the air flow control valve is shifted to the computed opening at a controlled driving speed or a predetermined driving speed. At this time, the actual opening of air flow control valve 6 continues to vary until the actual opening reaches the opening corresponding to the valve-opening command value. In order to calculate the ignition timing command value ADV depending on the air flow control valve opening varying, steps S41 and S42 are provided. At step S41, a check is made to determine whether a timing advance termination flag 2 is set to "1". Only when the timing advance does not terminate and thus the timing advance termination flag 2 is reset to "0", the routine proceeds from step S41 to step S42. At step S42, the timing advance termination flag 2 is set to "1". As soon as the timing advance termination flag 2 is set, the ignition timing command value ADV suitable for timing advance is computed in accordance with the flow chart of FIG. 16 described previously.

The operation of the control apparatus of the embodiment will be hereunder described in detail in reference to timing charts shown in FIGS. 4A–4G.

During the self-shutoff operating mode (see the left-hand side of FIG. 4A) which is executed after the ignition switch has been transferred from the ON state to the OFF state (see the left-hand side of FIG. 4B), within ECU 21 the specified number of angular steps corresponding to the predetermined intermediate valve-opening position which is predetermined to be suitable for the engine starting cranking period is calculated or counted on the basis of the previously-discussed step-motor zero point stored in the memory. Step motor 7 is driven or rotated in advance by the specified number of angular steps, and thus air flow control valve 6 moves towards the predetermined intermediate valve-opening position. Thereafter, by way of the self-shutoff control, electric power supply to the ECU is shut off and therefore the engine is stopped. After this, when the engine is restarted (see the leading edge of the starter switch signal shown in FIG. 4C and the leading edge of the idle switch signal shown in FIG. 4E) with a new cranking operation, or during the delay-time duration (see the "DELAY-TIME DURATION" shown in FIGS. 4A–4C), the battery voltage becomes less than the step-motor operation assurance voltage, and thus during such a period of time it is impossible to insure the accurate movement of air flow control valve 6 to the predetermined intermediate valve-opening position suitable for engine starting cranking period by means of the step motor. According to the system of the embodiment, air flow control valve 6 has been driven to the predetermined intermediate valve-opening position in advance during the engine stopping period (or the self-shutoff period), and additionally during the starting cranking period or during the predetermined delay-time duration (t1+α) the system inhibits the step motor from being driven and also operates to retain the air flow control valve at the predetermined intermediate valve-opening position. Thus, the system of the embodiment can avoid the control accuracy of air flow control valve 6 from deteriorating during the engine starting cranking period or during the predetermined delay-time duration (t1+α) during which the battery voltage tends to be less than the step-motor operation assurance voltage. Furthermore, according to the system of the embodiment, the predetermined intermediate valve opening to which air flow control valve 6 is driven in advance during the engine stopping period (or during the self-shutoff operating mode), is set to a predetermined opening that there is no risk of air flow control valve 6 to be stuck onto the port wall owing to the deposits and that ensures as small as wall fuel mass flow rate as possible during the engine starting cranking period. This effectively avoids the problem of sticking air flow control valve and ensures a good engine startability based on the less wall fuel mass flow rate. Upon expiration of the predetermined delay-time duration, the delay timer allows for the step motor to drive the air flow control valve. Thus, air flow control valve 6 is rotated or driven from the predetermined intermediate valve-opening position to the substantially fully-closed position corresponding to the predetermined substantially fully-closed-state opening by means of the step motor (see the down-sloped line from the "INTERMEDIATE VALVE-OPENING POSITION" to the "FULLY-CLOSED POSITION" in FIG. 4A). This effectively reduces the density of unburned HC emissions produced just after cold-engine starting. The combusting condition can be improved by driving the air flow control valve to the substantially fully-closed position just after the engine starting and thus strengthening the intake air flow velocity. As can be appreciated from the down-sloped line from the "IDLING-PERIOD ADV" to the "CATALYST-ACTIVATION ADV" in FIG. 4D, the ignition timing can be thus compensated for in the timing-retard direction as much as possible in comparison with the idling-period ignition timing which is preprogrammed to be suitable for the engine idling period within the predetermined delay-time duration. The ignition timing retard results in a rise in exhaust temperature, and thus a rapid catalyst activation can be promoted. If only the ignition timing is momentarily changed to a retarded timing corresponding to the predetermined substantially fully-closed-state opening when the air flow control valve is rotating from the predetermined intermediate valve-opening position to the substantially fully-closed position at the controlled driving speed (the predetermined driving speed) of step motor 7, there is a possibility of an excessive timing retard, and thus the combusting condition is lowered. To avoid this, according to the system of the embodiment, responsively to a change in the opening of air flow control valve 6 driven from the predetermined intermediate valve-opening position to the substantially fully-closed position at the controlled driving speed (predetermined driving speed) of step motor 7, the timing-retard correction value (HADV) is calculated every Ref signal input (see FIG. 12 and see the ignition timing command value ADV varying from the "IDLING-PERIOD ADV" to the "CATALYST-ACTIVATION ADV" in a substantially linear fashion in FIG. 4D). This effectively avoids the excessive timing retard. The idling state continues for a while with air flow control valve 6 kept at the predetermined substantially fully-closed-state opening. Then, as soon as the ECU determines that the catalyst has been activated (see FIG. 9 and see the transition from an OFF or numeral 0 condition to an ON or numeral 1 condition in FIG. 4F), the air flow control valve is driven towards the full-open position. Assuming that air flow control valve 6 remains kept at the predetermined substantially fully-closed-state opening in the presence of a demand for vehicle acceleration while catalyst 10 is activating, it is impossible to increase the quantity of intake air and whereby desired acceleration feeling cannot be obtained. In such a case, according to the system of the embodiment, ECU 21 determines that there is a demand for vehicle acceleration, in response to the transition from the turned-on state of idle switch 29 to the turned-off state (see the trailing edge of the idle switch signal indicated by the one-dotted line in FIG. 4E). In the presence of the demand for acceleration, the air flow control valve can be driven towards the opening based on the engine operating conditions (Ne, Tp) indicating the degree of vehicle acceleration (see an increase in the air flow control valve opening indicted by the one-dotted line in FIG. 4A). Thus, even when the demand for acceleration occurs while the catalyst is activating with the air flow control valve kept at the predetermined substantially fully-closed-state opening, it is possible to rapidly respond to the demand for acceleration. Additionally, according to the system of the embodiment, to avoid malfunction of the step motor owing to a battery-voltage drop during the engine starting cranking period, the step motor is driven to the predetermined intermediate valve-opening position in advance during the self-shutoff operating mode during which the battery voltage can be usually kept at a higher level than the predetermined step-motor operation assurance voltage such as a voltage of approximately 10 volts. This enhances the control accuracy of air flow control valve 6. FIG. 4G shows the ON state (energized state) and OFF state (deenergized state) of the downstream oxygen sensor heater. Upon expiration of the predetermined delay-time duration (t1+α), the heater is energized (see the leading edge of the pulse signal waveform of FIG. 4G) and simultaneously the ignition timing is retarded so as to rapidly activate the catalyst. Thereafter, as soon as the temperature of heated downstream oxygen sensor 28 reduces to below the predetermined operating temperature value, the heater is deenergized (see the trailing edge of the pulse signal waveform of FIG. 4G).

In the shown embodiment, the activated state of the catalyst is estimated based on the activated state of the downstream oxygen sensor. In lieu thereof, a temperature of the catalyst may be estimated or map-retrieved based on at least one of engine coolant temperature (Tw) and engine oil temperature, from a preprogrammed characteristic map showing how the catalyst temperature varies relative to engine coolant temperature (or relative to engine oil temperature). The activated state of the catalyst may be estimated based on the estimated or retrieved catalyst temperature. Alternatively, a temperature sensor is provided for directly monitoring a catalyst temperature. The activated state of the catalyst may be determined based on the catalyst temperature value monitored. In the embodiment, although the exhaust emission control apparatus of the invention is exemplified in an automotive spark ignition engine with a multi-point fuel injection system, it will be understood that the invention is not limited to the automotive spark ignition engine with the multi-point fuel injection system shown and described herein, the fundamental concept of the invention can be applied to an automotive spark ignition engine with a single-point fuel injection system. Also, in the embodiment, although the air flow control valve is provided just upstream of the injection nozzle of the fuel injector, the relationship of the installation position between the injector and the air flow control valve is not limited to the installation position of the air flow control valve described herein. For instance, the air flow control valve may be installed downstream of the fuel injector nozzle. In the system of the embodiment, after expiration of the predetermined delay-time duration (t1+α), the air flow control valve is driven towards the predetermined substantially fully-closed-state opening to reduce the unburned HC emissions density as much as possible. In lieu thereof, the air flow control valve opening to be set after expiration of the predetermined delay-time duration may be set or determined at a certain opening within a permissible width ranging from the sum of the predetermined substantially fully-closed-state opening and a predetermined positive margin β and the sum of the predetermined substantially fully-closed-state opening and a predetermined negative margin γ, taking account of avoidance of undesired sticking air flow control valve. In the system of the embodiment, a step motor or a stepper motor is used as an electric valve actuator for the air flow control valve. The other type of electric valve actuator may be used.

Figure 18:
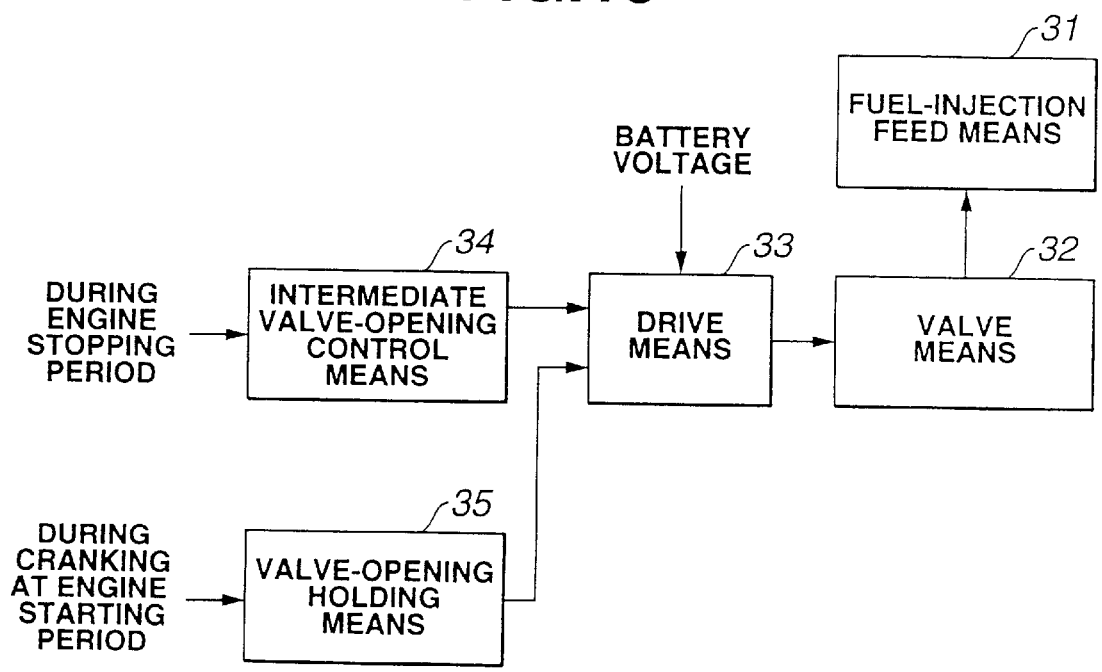
FIG. 18 is a block diagram showing the fundamental concept of the exhaust emission control apparatus of the invention.

Referring to FIG. 18, there is shown the fundamental concept of the control apparatus of the invention. In order to avoid deterioration of the control accuracy for the opening of an air flow control valve means 32, and to prevent malfunction of an electric valve drive means 33, occurring owing to a battery voltage drop less than a step-motor operation assurance voltage level during engine cranking at a starting period, the control apparatus of the invention has an intermediate valve opening control means 34 and a valve-opening holding means 35. Intake air flow exerts a greatly influence upon fuel behavior of fuel injected from a fuel-injection means 31. The intermediate valve opening control means 34 controls the opening of the air flow control valve means 32 to a predetermined intermediate valve opening by the electric valve drive means 33 during an engine stopping period. The predetermined intermediate valve opening is preset to a predetermined opening at which there is no risk of sticking the air flow control valve means 32 due to deposits during the engine stopping period and that ensures as small a wall fuel flow rate as possible during the engine-cranking operating mode. On the other hand, the valve-opening holding means 35 holds the air flow control valve means 32 at the predetermined intermediate valve opening to which the air flow control valve means 32 has been driven in advance during the engine stopping period, by inhibiting operation of the electric valve drive means 33 during an engine-cranking operating mode at a starting period.

The entire contents of Japanese Patent Application No. P11-370134 (filed Dec. 27, 1999) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An exhaust emission control apparatus of an internal combustion engine, comprising:
   a fuel injector which injects fuel into an intake air passage;
   an intake air flow control valve which controls intake air flow exerting an influence upon a behavior of fuel injected from the fuel injector;
   a valve actuator which is electrically operated by a storage battery serving as an electric power source to drive the intake air flow control valve; and
   a control unit connected electrically to at least the valve actuator for controlling an opening of the intake air flow control valve, the control unit having a processor programmed to perform the following,
      (a) controlling the opening of the intake air flow control valve to a predetermined intermediate valve opening by the valve actuator during an engine stopping period; and
      (b) holding the intake air flow control valve at the predetermined intermediate valve opening, by inhibiting operation of the valve actuator during an engine-cranking operating mode at an engine restarting period.

2. The exhaust emission control apparatus as claimed in claim 1, wherein the processor of the control unit is programmed to hold the intake air flow control valve at the predetermined intermediate valve opening, by inhibiting the operation of the valve actuator for a predetermined delay-time duration from a time when the engine-cranking operating mode has been completed.

3. The exhaust emission control apparatus as claimed in claim 1, wherein the predetermined intermediate valve opening is preset to a predetermined opening so as to prevent sticking of the air flow control valve due to deposits during the engine stopping period.

4. The exhaust emission control apparatus as claimed in claim 3, wherein the predetermined intermediate valve opening is preset to a valve opening greater than or equal to substantially 25° and less than or equal to substantially 45°, where a full-closed position of the intake air flow control valve is a valve opening of 0° and a fully-opened position of the intake air flow control valve is a valve opening of 90°.

5. The exhaust emission control apparatus as claimed in claim 2, wherein the intake air flow control valve is driven toward a fully-closed position by the valve actuator during engine idling after expiration of the predetermined delay-time duration.

6. The exhaust emission control apparatus as claimed in claim 2, wherein the intake air flow control valve is driven toward a valve opening that reduces a density of unburned hydrocarbons emissions by the valve actuator during engine idling after expiration of the predetermined delay-time duration.

7. The exhaust emission control apparatus as claimed in claim 5, wherein the engine comprises an electronic ignition system, and the control unit is connected electrically to a spark plug of the electronic ignition system for controlling an ignition timing of the spark plug, and an ignition timing used during the engine idling after expiration of the predetermined delay-time duration is retarded in comparison with an ignition timing used during the predetermined delay-time duration.

8. The exhaust emission control apparatus as claimed in claim 6, wherein the engine comprises an electronic ignition system, and the control unit is connected electrically to a spark plug of the electronic ignition system for controlling an ignition timing of the spark plug, and an ignition timing used during the engine idling after expiration of the predetermined delay-time duration is retarded in comparison with an ignition timing used during the predetermined delay-time duration.

9. The exhaust emission control apparatus as claimed in claim 5, wherein the engine comprises an electronic ignition system, and the control unit is connected electrically to a spark plug of the electronic ignition system for controlling an ignition timing of the spark plug, and the processor of the control unit variably controls the ignition timing responsively to the opening of the intake air flow control valve which is shifting to the fully-closed position at a predetermined speed when the air flow control valve is driven to the fully-closed position by the valve actuator.

10. The exhaust emission control apparatus as claimed in claim 6, wherein the engine comprises an electronic ignition system, and the control unit is connected electrically to a spark plug of the electronic ignition system for controlling an ignition timing of the spark plug, and the processor of the control unit variably controls the ignition timing responsively to the opening of the intake air flow control valve which is shifting to the valve opening that reduces the density of unburned hydrocarbons emissions at a predetermined speed when the air flow control valve is driven to the valve position that reduces the density of unburned hydrocarbons emissions by the valve actuator.

11. The exhaust emission control apparatus as claimed in claim 5, which further comprises a catalyst provided in an exhaust passage, and wherein the processor of the control unit is programmed to drive the intake air flow control valve toward a fully-opened position by the valve actuator when the catalyst becomes activated.

12. The exhaust emission control apparatus as claimed in claim 6, which further comprises a catalyst provided in an exhaust passage, and wherein the processor of the control unit is programmed to drive the intake air flow control valve toward a fully-opened position by the valve actuator when the catalyst becomes activated.

13. The exhaust emission control apparatus as claimed in claim 5, which further comprises a catalyst provided in an exhaust passage, and wherein the processor of the control unit is programmed to drive the intake air flow control valve toward a valve opening based on engine operating conditions by the valve actuator when an idle switch is turned off before the catalyst becomes activated.

14. The exhaust emission control apparatus as claimed in claim 6, which further comprises a catalyst provided in an exhaust passage, and wherein the processor of the control unit is programmed to drive the intake air flow control valve toward a valve opening based on engine operating conditions by the valve actuator when an idle switch is turned off before the catalyst becomes activated.

15. The exhaust emission control apparatus as claimed in claim 1, wherein the processor of the control unit is programmed to execute a self-shutoff operating mode in which the engine is stopped after a predetermined process while maintaining an idling state of the engine after an ignition switch is turned off, and the engine stopping period is within a period of time corresponding to the self-shutoff operating mode.

16. The exhaust emission control apparatus as claimed in claim 1, wherein the valve actuator comprises a step motor.

17. An internal combustion engine comprising:
   fuel-injection means for injecting fuel into an intake air passage;
   valve means for controlling intake air flow exerting an influence upon a behavior of fuel injected from the fuel-injection means;
   drive means electrically operated by a storage battery serving as an electric power source for driving the valve means; and
   a control unit connected electrically to at least the drive means and the storage battery for controlling an opening of the valve means, the control unit comprising:
      (a) means for controlling the opening of the valve means to a predetermined intermediate valve opening by the drive means during an engine stopping period; and
      (b) means for holding the valve means at the predetermined intermediate valve opening to which the valve means has been driven in advance during the engine stopping period, by inhibiting operation of the drive means during an engine-cranking operating mode at an engine restarting period.

18. A method of controlling exhaust emissions emitted from an internal combustion engine with a fuel injector injecting fuel into an intake air passage, an intake air flow control valve, and an electric valve actuator electrically operated by a storage battery serving as an electric power source to drive the intake air flow control valve, the method comprising:
   controlling intake air flow exerting an influence upon a behavior of fuel injected from the fuel injector;
   controlling the opening of the intake air flow control valve to a predetermined intermediate valve opening by the electric valve actuator during an engine stopping period; and
   holding the intake air flow control valve at the predetermined intermediate valve opening, by inhibiting operation of the electric valve actuator during an engine-cranking operating mode at an engine restarting period.

19. The method as claimed in claim 18, further comprising:
   inhibiting the operation of the valve actuator for a predetermined delay-time duration from a time when the engine-cranking operating mode has been completed; and
   enabling the operation of the valve actuator to drive the air flow control valve toward a valve opening that reduces a density of unburned hydrocarbons emissions during engine idling after expiration of the predetermined delay-time duration.

20. The method as claimed in claim 19, wherein the engine comprises a spark plug included in an electronic ignition system, and which further comprises retarding an ignition timing used during the engine idling after expiration of the predetermined delay-time duration in comparison with an ignition timing used during the predetermined delay-time duration.

21. The method as claimed in claim 20, further comprising variably controlling the ignition timing responsively to a change in the opening of the intake air flow control valve which is shifting to the valve opening that reduces the density of unburned hydrocarbons emissions at a predetermined speed by the operation of the valve actuator.

22. The method as claimed in claim 21, further comprising driving the intake air flow control valve toward a full-open position by the valve actuator from a time when a catalyst provided in an exhaust system of the engine becomes activated.

23. The method as claimed in claim 22, further comprising driving the intake air flow control valve toward a valve opening based on engine operating conditions by the valve actuator when an idle switch is turned off before the catalyst becomes activated.

24. The method as claimed in claim 23, further comprising driving the intake air flow control valve toward the predetermined intermediate valve opening by the electric valve actuator during a self-shutoff operating mode in which the engine is stopped after a predetermined process while maintaining an idling state of the engine after an ignition switch is turned off.

* * * * *